US009185349B2

(12) United States Patent
Kamibeppu

(10) Patent No.: US 9,185,349 B2
(45) Date of Patent: Nov. 10, 2015

(54) COMMUNICATION TERMINAL, SEARCH SERVER AND COMMUNICATION SYSTEM

(75) Inventor: Shinichi Kamibeppu, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 12/994,829

(22) PCT Filed: May 27, 2009

(86) PCT No.: PCT/JP2009/059722
§ 371 (c)(1),
(2), (4) Date: Nov. 26, 2010

(87) PCT Pub. No.: WO2009/145233
PCT Pub. Date: Dec. 3, 2009

(65) Prior Publication Data
US 2011/0078202 A1    Mar. 31, 2011

(30) Foreign Application Priority Data

May 28, 2008    (JP) .................................. 2008-139394
Aug. 28, 2008    (JP) .................................. 2008-220124

(51) Int. Cl.
*G06F 7/00*      (2006.01)
*G06F 17/30*     (2006.01)
(Continued)

(52) U.S. Cl.
CPC ....... *H04N 7/17318* (2013.01); *H04N 21/4722* (2013.01)

(58) Field of Classification Search
CPC ................... G06F 17/30017; G06F 17/30289; G06F 17/30781; G06F 17/30817; G06F 17/30038; G06F 17/30843; H04N 21/4722; H04N 21/4312; H04N 21/44008
USPC .............. 707/1/1, 999.107, 999.01, 792, 732, 707/804, 999.1; 345/619; 725/120, 25, 725/32–46, 114–115; 726/26; 386/200, 386/240–241, 291; 705/26.62; 348/157, 348/211.8, 575, 739, 460; 709/201, 217, 709/219, 231–232; 382/190
See application file for complete search history.

(56) References Cited

U.S. PATENT DOCUMENTS 7,054,834 B2 *  5/2006  Hatakeyama ............... 705/26.62
7,240,075 B1    7/2007  Nemirofsky et al.
(Continued)

FOREIGN PATENT DOCUMENTS

EP    1 821 526 A2    8/2007
EP    2 306 717 A1    4/2011
(Continued)

OTHER PUBLICATIONS

Extended European Search Report dated Feb. 3, 2012 for European Application No. EP 09 75 4741.
(Continued)

*Primary Examiner* — Usmaan Saeed
*Assistant Examiner* — Cecile Vo
(74) *Attorney, Agent, or Firm* — Oliff PLC

(57) ABSTRACT

According to conventional arts, object data must be included in video data in advance. However, including the object data in the video data causes a problem to increase a data amount to be transmitted from a broadcasting station (transmission terminal) to a reception terminal. In addition, according to the conventional arts, since there is no opportunity to previously insert the object data in video data of real-time broadcasting such as live broadcasting, the user cannot display detailed information of a desired object. Provided is a technique to display detailed information of a desired object in video without increasing an amount of data in distribution of the video data when a user indicates the object in the video through a touch panel or the like, by transmitting indicated coordinate information and indication timing information corresponding to such indication to a search server, obtaining corresponding object data from the search server and displaying the object data on the display.

25 Claims, 21 Drawing Sheets

(51) Int. Cl.
*H04N 7/173* (2011.01)
*H04N 21/4722* (2011.01)
*G06F 13/14* (2006.01)

(56) References Cited

U.S. PATENT DOCUMENTS

| | | | |
|---|---|---|---|
| 2003/0051252 | A1 | 3/2003 | Miyaoku et al. |
| 2008/0079754 | A1 | 4/2008 | Kuroki |
| 2009/0009605 | A1* | 1/2009 | Ortiz .............................. 348/157 |
| 2010/0017820 | A1* | 1/2010 | Thevathasan et al. .......... 725/35 |
| 2010/0162303 | A1* | 6/2010 | Cassanova ....................... 725/37 |
| 2011/0001758 | A1* | 1/2011 | Chalozin et al. ............... 345/619 |
| 2011/0078202 | A1 | 3/2011 | Kamibeppu |

FOREIGN PATENT DOCUMENTS

| | | |
|---|---|---|
| JP | A-4-175979 | 6/1992 |
| JP | A-8-96156 | 4/1996 |
| JP | H099289 A | 1/1997 |
| JP | A-2004-200932 | 7/2004 |
| JP | A-2005-159743 | 6/2005 |
| JP | 2007-243630 A | 9/2007 |
| JP | A-2008-35006 | 2/2008 |
| JP | B2-4870820 | 11/2011 |

OTHER PUBLICATIONS

Japanese Office Action dated Jul. 12, 2011 for Japanese Patent Application No. 2009-537436 (with translation).

International Search Report dated Jun. 30, 2009 in corresponding International Application No. PCT/JP2009/059722 (with translation).

Jun. 4, 2013 Office Action issued in Japanese Patent Application No. 2011-251482 (with translation).

Aug. 20, 2013 Office Action issued in Japanese Patent Application No. 2011-251482 (with Concise Explanation).

Jun. 23, 2015 Office Action issued in Japanese Patent Applicaiton No. 2011-251482.

* cited by examiner

COMMUNICATION TERMINAL, SEARCH SERVER AND COMMUNICATION SYSTEM

CROSS REFERENCE TO RELATED APPLICATIONS

This application claims priority to and the benefit of Japanese Patent Application No. 2008-139394 (filed on May 28, 2008) and Japanese Patent Application No. 2008-220124 (filed on Aug. 28, 2008), the entire contents of which are incorporated herein by reference.

TECHNICAL FIELD

The present invention relates to communication terminals, search servers and communication systems, and in particular, to a communication terminal which, if a user indicates an object in a video through a touch panel and the like, obtains data of the object corresponding to such indication from a search server and displays the data on a screen, a search server which, when receiving indication information of the user, searches for data of the object corresponding to the indication and transmits the data to the communication terminal, and a communication system including the communication terminal and the search server.

BACKGROUND ART

In recent years, a user can view video data via a variety of broadcasting/communication infrastructures, such as satellite or terrestrial digital broadcasting and video streaming using telecommunication links such as the internet. On a screen of the video data, various objects such as people and things (hereinafter, referred to as "object" which is, for example, talent/player/commercial product) are displayed. Since such objects tend to attract the interest of users, it may improve convenience for the user, in response to the user's wish to obtain predetermined information on an object (hereinafter, referred to as "object data" which is attribute information such as picture/name/affiliation of the talent/player/commercial product), to display corresponding object data on the screen, for example.

There is a conventional method to improve such convenience by inserting a list of object data included in the screen of the digital broadcasting into broadcasting data in advance. According to this method, since the list of the object data together with the video data is included in the digital broadcasting received by the user, the user can obtain desired object data by comparing the video and the list of the object data.

For example, area information and the like specifying a display area of each object in a TV broadcasting frame of a program is integrally associated with the TV broadcasting frame of the program and transmitted as digital data. There is known an interactive digital CM broadcasting system in which, when the TV program having the display area in the TV broadcasting frame of the program is received by a reception terminal apparatus, detailed information on the object in the display area is displayed together with the TV broadcasting frame on a monitor screen of the receiving means, in response to selective indication of the display area with a pointer or push on a data display button (Patent Document 1, for example). As described above, since the area information for each object is preset on the video, the object data can be displayed on the screen when the user indicates vicinity of a desired object.

RELATED ART DOCUMENT

Patent Document

Patent Document 1: Japanese Patent Application Laid-Open No. 2004-200932

SUMMARY OF INVENTION

Technical Problem

However, the above conventional arts require a broadcasting station (transmission terminal) to insert object data into the video data in advance, which causes increase in a data amount transmitted from the broadcasting station (transmission terminal) to a reception terminal. In addition, it is unlikely that the user refers to all object data included in the video data. Therefore, the object data which the user does not refer to results in unnecessary information, which is not preferable from the point of view of effective use of a broadcasting (communication) resource.

Moreover, the method of Patent Document 1 in which the broadcasting station (transmission terminal) sets the area information for each object of all programs requires a great amount of burdens. Thus, it is not practical to set the area information for each object in all programs or to insert the object data into the video data in advance.

Furthermore, since the conventional method cannot provide an opportunity for the broadcasting station (transmission terminal) to insert the object data into real-time video data such as live broadcasting, it is not possible with the conventional method alone to display the detailed information on the object desired by the user.

Accordingly, an object of the present invention in consideration of the above problems is to provide a communication terminal, a search server and a communication system capable of displaying detailed information of a desired object in the video on the screen without increasing the amount of distribution data when the video data are distributed.

Solution to Problem

In order to solve the above problems, a communication terminal according to the present invention includes: a video data reception unit for receiving video data; a display unit for displaying the video data received by the video data reception unit; an indication input unit for receiving indication input to the display unit; an indication recognition unit for recognizing whether the indication input is an indication to video displayed on the display unit; a transmission unit for transmitting search data to a search server when the indication recognition unit recognizes the indication to the video, wherein the search data include indicated coordinate information based on the indication and indication timing information at the indication; an object data reception unit for receiving object data searched by the search server based on the search data; and a control unit for controlling the display unit to display the object data received by the object data reception unit.

It is preferred that the search data include a plurality of indication timing information indicating times before the indication.

It is preferred that, if the indication recognition unit recognizes continuous indications to the video, the search data includes indicated coordinate information and indication timing information based on each of the continuous indications.

It is preferred that, if the indication recognition unit recognizes continuous indications to the video having a locus of indicated coordinates with an intersection, the search data include indicated coordinate information on a range surrounded by the locus of the indicated coordinates of the continuous indications and indication timing information corresponding to the continuous indications.

It is preferred to further include an indication form determination unit for determining a form drawn by a locus of indicated coordinates of continuous indications to the video and that, if the indication form determination unit determines that an indication form is a circle, the search data includes indicated coordinate information on a central coordinate of the circle calculated by the indication form determination unit, indicated coordinate information indicating an indication farthermost from the central coordinate among the continuous indications, and indication timing information corresponding to one of the continuous indications.

It is preferred to further include an indication form determination unit for determining a form drawn by a locus of indicated coordinates of continuous indications to the video and, if the indication form determination unit determines that the indication form is a line, the search data includes at least indicated position coordinate and indication timing information corresponding to a first indication of the continuous indications and indicated position coordinate and indication timing information corresponding to a last indication on the continuous indications.

It is preferred that the indicated coordinate information is based on a coordinate system of the video data.

It is preferred that the indicated coordinate information is based on the coordinate system of the display unit of the terminal and that the search data includes terminal screen information of the display unit of the terminal.

It is preferred that, if the indication recognition unit recognizes an indication to the video, the control unit specifies a service identifier for identifying a service to provide the video data and insets the service identifier into the search data.

It is preferred that, if a first service identifier included in the search data is identical to a second service identifier for identifying a service to provide video data displayed on the display unit when the object data reception unit receives the object data from the search server, the control unit displays the object data on the display unit.

It is preferred that, if a first service identifier included in the search data is not identical to a second service identifier for identifying a service to provide video data displayed on the display unit when the object data reception unit receives the object data from the search server, the control unit displays that the object data are received on the display unit.

It is preferred to include a memory unit for storing object data received from the search server and, if a first service identifier included in the search data is not identical to a second service identifier for identifying a service to provide video data displayed on the display unit when the object data reception unit receives the object data from the search server, the control unit stores the object data in the memory unit and, when the service to provide the video data displayed on the display unit is changed and the first service identifier and the second service identifier becomes identical to each other, displays the object data stored in the memory on the display unit.

It is preferred that, if the object data includes information on a plurality of objects, the control unit displays individual images specified based on the indicated coordinate and information on the plurality of objects on the display unit.

It is preferred that, if the indication recognition unit recognizes an indication to the individual images, the control unit enlarges the individual images on the display unit and, if the indication recognition unit recognizes an indication to an individual image enlarged, the control unit displays object data of an object corresponding to the indication on the display unit.

It is preferred that, if the indication recognition unit recognizes an indication to the information on the plurality of objects, the control unit displays object data of an object corresponding to the indication on the display unit.

It is preferred to include a remote operation communication unit for communicating with a remote operation terminal capable of remotely inputting an indication to the display unit.

It is preferred to include the remote operation terminal which has a remote operation unit for receiving an indication input to the display unit and a second remote operation communication unit for communicating with the remote operation communication unit.

It is preferred that the remote operation terminal has a second display unit and the control unit displays the object data received by the object data reception unit on the second display unit.

It is preferred that the remote operation terminal has a second transmission unit for transmitting the search data to the search server and a second object data reception unit for receiving object data searched by the search server based on the search data.

In order to solve the above problems, a search server according to the present invention includes: a memory unit for recording video data and object data of at least one object shown in video; a reception unit for receiving search data from a communication terminal, wherein the search data include indicated coordinate information based on an indication to the video and indication timing information at the indication; a recognition unit for recognizing an object corresponding to the indication to the video based on the search data; a search unit for searching for object data, corresponding to the object recognized by the recognition unit, in the memory unit; a search result creation unit for creating a search result including the object data searched by the search unit; and a transmission unit for transmitting the search result to the communication terminal.

It is preferred that the recognition unit recognizes an object corresponding to the indication to the video, further based on timing information indicating a time before the indication timing information and the indicated coordinate information.

It is preferred that, if the search data includes a plurality of indicated coordinate information and indication timing information, the recognition unit recognizes an object corresponding to the indication to the video based on the plurality of indicated coordinate information and the indication timing information.

It is preferred that, if the search data includes two indicated coordinate information and a single indication timing information, the recognition unit recognizes one of the indicated coordinate information as that indicating a central coordinate of a circle and the other indicated coordinate information as that of an indication farthermost from the central coordinate of the circle and, based on a coordinate within the circle defined by the two indicated coordinate information and the single indication timing information, recognizes an object corresponding to the indication to the video.

It is preferred that, if the search data includes at least two combinations of indicated coordinate information and indication timing information, the recognition unit recognizes the indicated coordinate information and the indication timing information of one of the at least two combinations as indicated coordinate information indicating a start of a line and indication timing information at the start of an instruction, respectively, and the indicated coordinate information and the indication timing information of the other combination of the at least two combinations as indicated coordinate information indicating an end of the line and indication timing information at the end of the indication, respectively, and recognizes an object corresponding to the indication to the video along the line defined by the at least two combinations.

It is preferred that, if the indicated coordinate information included in the search data is based on a coordinate system of a screen of the terminal and the search data includes terminal screen information on the screen of the terminal, the recognition unit, based on the terminal screen information, converts the indicated coordinate information into a coordinate system of the video data and recognizes an object corresponding to the indication by the user.

It is preferred that, if the recognition unit recognizes a plurality of objects corresponding to the indication to the video, the search unit searches for a plurality of object data corresponding to the plurality of objects, respectively, and the search result creation unit inserts the plurality of object data and individual images, specified based on the indicated coordinate, into the search result.

In order to solve the above problems, a communication system according to the present invention includes: a search server for storing video data and object data included in the video; and a communication terminal for receiving and displaying the video data and communicating with the search server, wherein the communication terminal recognizes an indication to the video and transmits search data to the search server, wherein the search data include indicated coordinate information based on the indication and indication timing information at the indication, the search server receives the search data, searches for object data corresponding to the search data and transmits the object data searched to the communication terminal, and the communication terminal receives and displays the object data.

Effect of the Invention

According to the invention, since there is no need to inset information on objects into video data in advance, it is possible to provide a communication terminal, a search server and a communication system capable of displaying detailed information on a desired object in the video on the screen without increasing an amount of distribution data in distributing the video data.

DESCRIPTION OF EMBODIMENTS

Embodiments of the present invention will be described with reference to the accompanying drawings.

Figure 1:
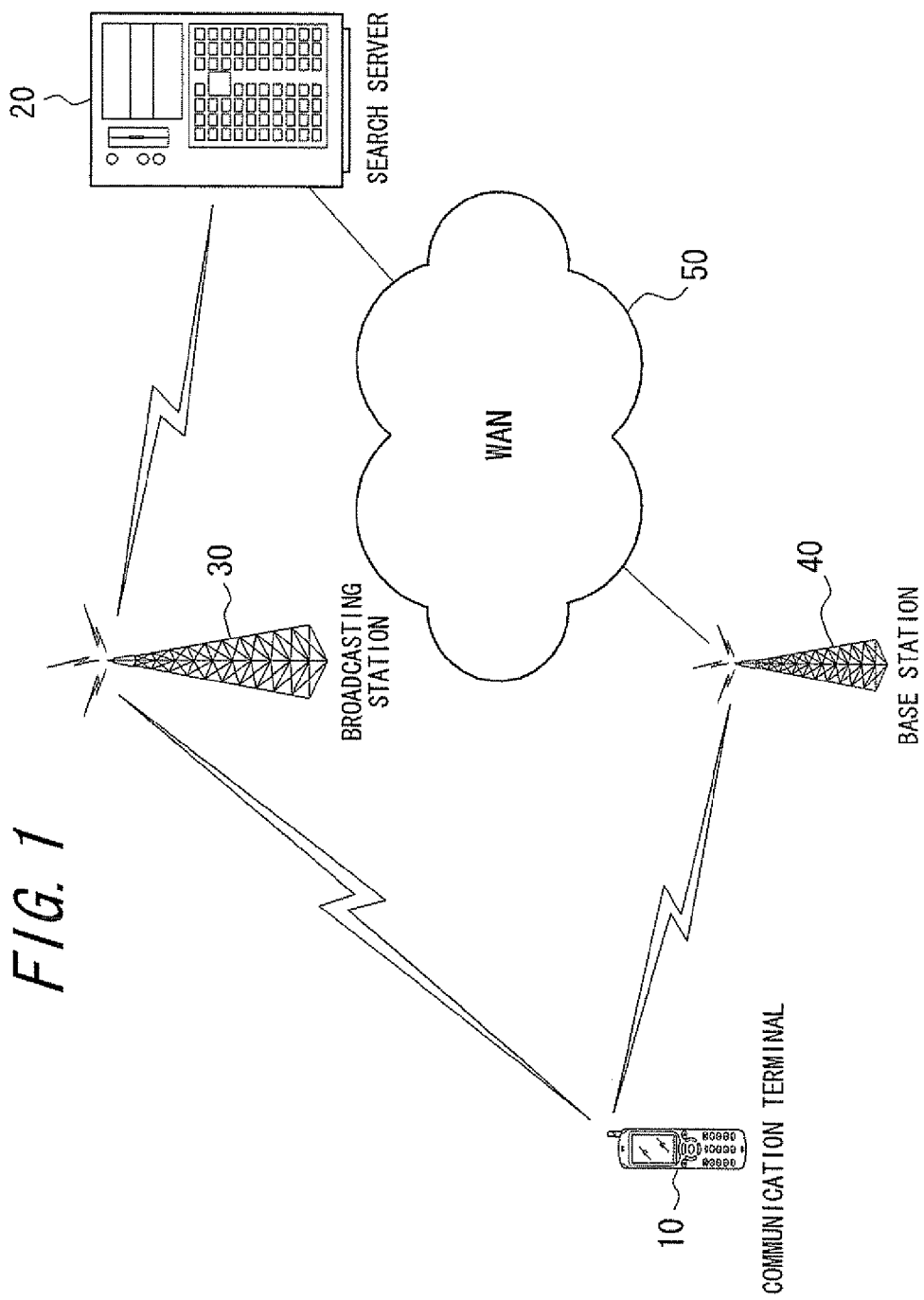
FIG. 1 is a diagram illustrating a schematic constitution of a communication network a communication terminal according to one embodiment of the present invention can use.

FIG. 1 is a diagram illustrating a schematic constitution of a communication network that a communication terminal according to an embodiment of the present invention can use. In FIG. 1, a communication terminal 10 receives digital broadcasting (video data) from a broadcasting station 30. In addition, the communication terminal 10 obtains detailed information (object data) on an object included in the video data from a search server 20 via a base station 40 and a WAN (Wide Area Network) 50. The object data stored in the search server 20 are set by the broadcasting station 30.

The communication terminal 10 is a mobile phone or a PDA (Personal Digital Assistance) having a digital broadcasting reproduction function or a TV having a communication function, whereas the broadcasting station 30 is a broadcasting station of a terrestrial digital broadcasting (1 seg broadcasting), for example. The search server 20 may be either provided to each broadcasting station or shared by a plurality of broadcasting stations. The base station 40 may be a base station of cdma2000 EV-DO, iBurst (registered trademark), WiMAX (registered trademark) or a wireless LAN, for example.

Figure 2:
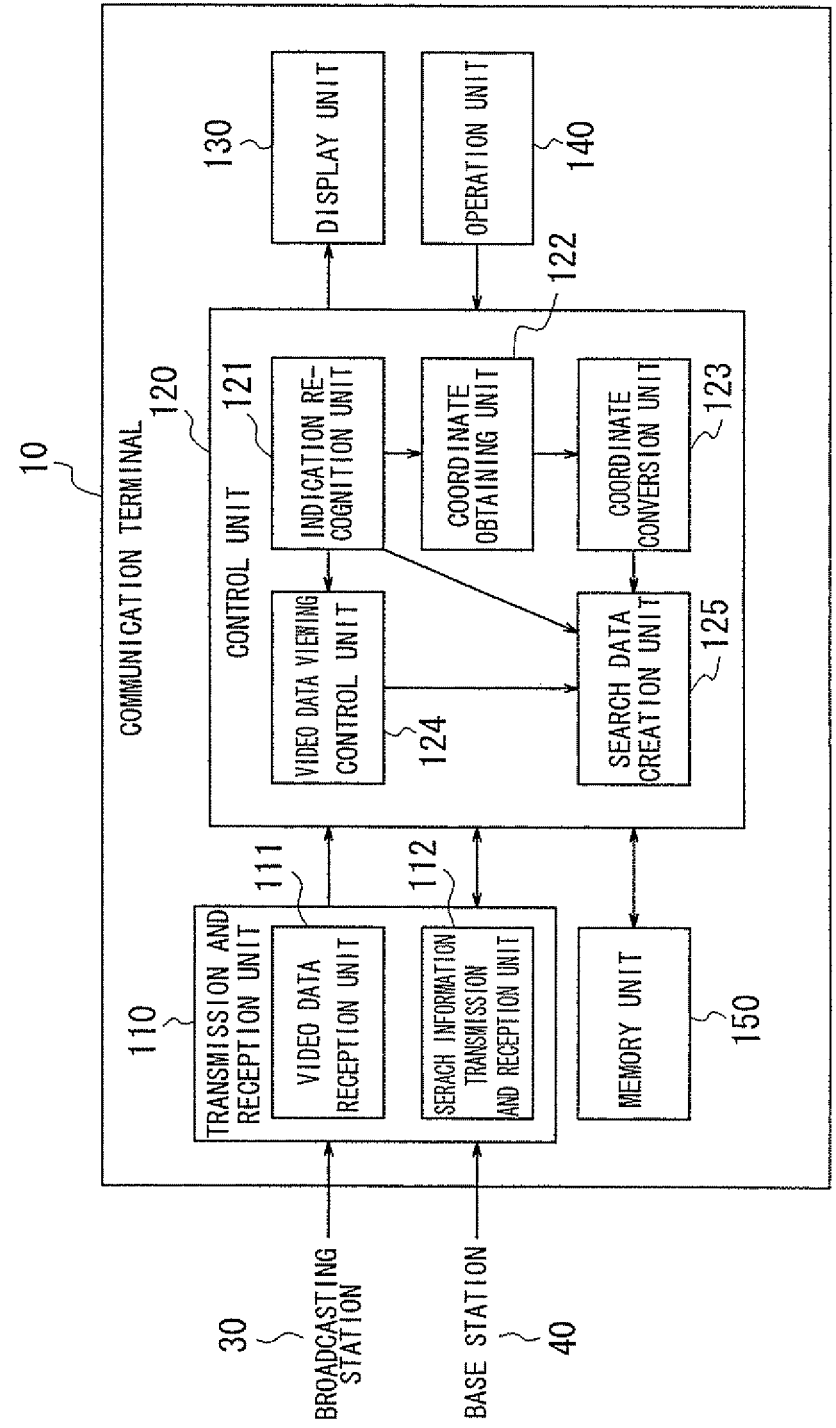
FIG. 2 is a functional block diagram illustrating a schematic constitution of the communication terminal according to one embodiment of the present invention.

FIG. 2 is a functional block diagram illustrating a schematic constitution of the communication terminal 10 shown in FIG. 1. The communication terminal 10 has a transmission and reception unit 110 for receiving the video data from the broadcasting station 30 and for transmitting and receiving search information of object data to/from the search server 20 via the base station 40, a control unit 120 for controlling viewing of the video data received by the transmission and reception unit 110 and the search information transmitted and received by the transmission and reception unit 110, a display unit 130 for displaying the video data and the search infatuation controlled by the control unit 120, an operation unit 140 for obtaining an operation of the terminal by a user, and a memory unit 150 for storing the search information received by the transmission and reception unit 110.

The transmission and reception unit 110 has a video data reception unit 111 and a search information transmission and reception unit 112. The video data reception unit 111 receives video data from the broadcasting station 30. The video data are composed of broadcasting data of the terrestrial digital broadcasting (I seg broadcasting), for example, and the video data reception unit 111 is an interface device corresponding to reception of such broadcasting waves. The search information transmission and reception unit 112 constitutes a transmission unit and an object data reception unit and transmits and receives search information of an object data in a video to/from the search server 20 via the base station 40. The search information transmission and reception unit 112 is an interface device, which complies with a wireless communication standard such as cdma2000 EV-DO, iBurst (registered trademark), WiMAX (registered trademark) or the wireless LAN, for example.

The control unit 120 has an indication recognition unit 121, a coordinate obtaining unit 122, a coordinate conversion unit 123, a video data viewing control unit 124 and a search data creation unit 125. The control unit 120 may be any suitable processor such as a CPU (Central Processing Unit), for example. Each function unit 121 to 125 of the control unit 120 may be configured by software executed on the processor or a dedicated processor specialized for processing of each function (for example, GPU (Graphics Processing Unit) or DSP (Digital Signal Processor)).

The indication recognition unit 121 obtains operation of the terminal by the user from the operation unit 140 and determines whether the user indicates an image displayed on the display unit 130. If the user indicates an image displayed on the display unit 130, the indication recognition unit 121 sends a notification that the user indicates the image (hereinafter, referred to as a "user indication notification") to the coordinate obtaining unit 122 and the video data viewing control unit 124.

When receiving the user indication notification from the indication recognition unit 121, the coordinate obtaining unit 122 obtains a coordinate indicated by the user (hereinafter, referred to as "indicated coordinate information"). An indicated coordinate shows a location on the display unit 130 based on a coordinate system of the display unit 130 of the communication terminal 10. For example, if a pixel at the upper left corner of the display unit 130 is a coordinate origin, a coordinate thereof is (0, 0), and the coordinate is increased as the pixel is located more rightward or more downward. The coordinate obtaining unit 122 provides the indicated coordinate information to the coordinate conversion unit 123.

When obtaining the indicated coordinate information from the coordinate obtaining unit 122, the coordinate conversion unit 123 converts the indicated coordinate information into a coordinate according to a coordinate system of the video data based on information such as screen resolution of the communication terminal 10 and the like. As stated above, since being based on the display unit 130 (screen) of the communication terminal 10, the indicated coordinate information provided from the coordinate obtaining unit 122 varies for each model of the communication terminal 10 depending on parameters such as screen resolution and an aspect ratio (16:9, 4:3 and the like) and a display mode such as a portrait orientation or a landscape orientation. Therefore, since the coordinate conversion unit 123 converts the indicated coordinate information into a coordinate according to the coordinate system of the video data based on information on the screen of the communication terminal, it is possible to clarify which location in the video is indicated by the user, regardless of the model of the communication terminal 10. Here, according to the coordinate system of the video data, a coordinate at the upper left corner is (0, 0) and the coordinate is increased as the pixel is located more rightward or more downward. The coordinate conversion unit 123 provides the search data creation unit 125 with the indicated coordinate information converted.

The video data viewing control unit 124 performs viewing control, such as timing control of data decoding and screen display, on the video data received by the video data reception unit 111. In addition, when receiving the user indication notification from the indication recognition unit 121, the video data viewing control unit 124 obtains timing information of the video data (hereinafter, referred to as "indication timing information") at a point when the user indicates an image on the display unit 130. The indication timing information is predetermined time stamp information of the video data such as a broadcasting time of the digital broadcasting and a reproduction time of the video data stored in a memory and the like and is used as a reference for determination on which frame of the video data the user indicates. The video data viewing control unit 124 provides the search data creation unit 125 with the indication timing information.

The search data creation unit 125 obtains the indicated coordinate information from the coordinate conversion unit 123 and also obtains the indication timing information from the video data viewing control unit 124. The search data creation unit 125 creates search data including the indicated coordinate information and the indication timing information and provides the generated search data to the search information transmission and reception unit 112.

Service to provide video data includes a program provided by the broadcasting station or a program distributed by a video distribution system using the internet and the like. A service identifier is used for identification of a service to provide the video data. Here, the service identifier is identification information, such as a name of the broadcasting station distributing the video data or a program, or URL used to distribute the program, for identifying the video data. In the present embodiment, the service identifier included in the search data is referred to as a first service identifier. For example, if the search server 20 is shared by a plurality of broadcasting stations, the search server 20 can identify the broadcasting station identified by the user, by using the service identifier.

The search information transmission and reception unit 112 transmits the search data obtained from the search data creation unit 125 to the search server 20 via the base station 40. The search data is a retrieval key used by the search server 20 to search for desired object data. As destination information (address) of the search server, it is possible to use an address preset to each broadcasting station or an address dynamically obtained from a plurality of search servers by using DNS (Domain Name System) and the like based on broadcasting station information included in the broadcasting data. The search information transmission and reception unit 112 receives a search result in accordance with the search data from the search server 20. According to the present embodiment, a service identifier for identifying a service providing the video data displayed on the display unit 130 when the search information transmission and reception unit 112 receives the search result from the search server 20, is defined as a second service identifier.

If the search result received from the search server 20 includes the object data, the control unit 120 displays the object data on the display unit 130. If the search result received from the search server 20 indicates an error, the control unit 120 displays the error on the display unit 130.

The display unit 130 displays the video data controlled by the video data viewing control unit 124 and may be a liquid crystal display or any suitable display device.

The operation unit 140 constitutes an indication input unit and obtains any operational input to the communication terminal 10 by the user. For example, the operation unit 140 may be a touch panel, remote controller, mouse, or any suitable pointing device.

The memory unit 150 stores the search result received from the search server 20 and may be a SRAM, EEPROM or any suitable record medium. For example, if the user changes a broadcasting channel to view a video after the communication terminal 10 transmits the search data to the search server 20, before the search result from the search server 20 is received (in other words, if the first service identifier and the second service identifier are not identical), the memory unit 150 may store the search result temporarily. In this case, if the user returns a channel to the previous broadcasting channel, which has been viewed when the search data were transmitted, the control unit 120 may display the search result (object data) corresponding to the broadcasting channel already received, by referring to the memory unit 150.

Figure 3:
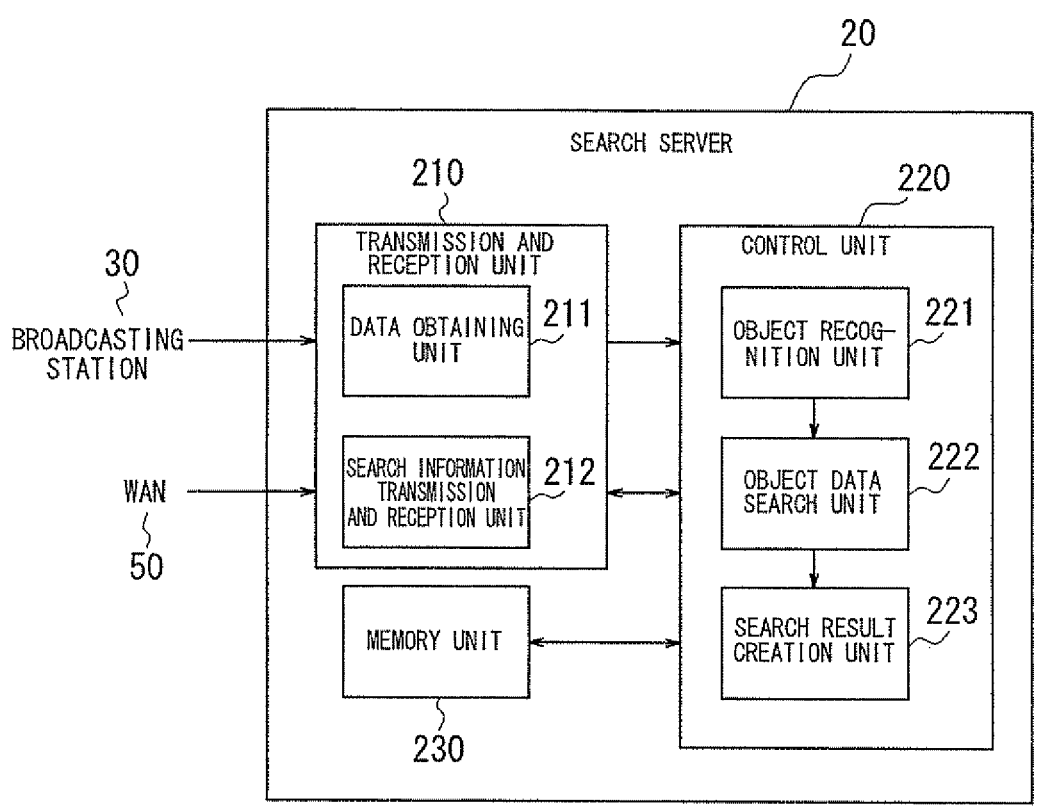
FIG. 3 is a functional block diagram illustrating a schematic constitution of a search server according to one embodiment of the present invention.

FIG. 3 is a functional block diagram illustrating a schematic constitution of the search server 20 shown in FIG. 1. The search server 20 has a transmission and reception unit 210 for transmitting and receiving data with the broadcasting station 30 and the WAN 50, a control unit 220 for searching object data corresponding to search data transmitted from the communication terminal 10 and for creating a search result including the object data, and a memory unit 230 for storing video data received from the broadcasting station 30 and object data of an object included in the video data.

The transmission and reception unit 210 has a data obtaining unit 211 for obtaining data from the broadcasting station 30 and a search information transmission and reception unit 212 for transmitting and receiving the search information to/from the communication terminal 10 via the WAN 50. While obtaining the video data from the broadcasting station 30, the data obtaining unit 211 obtains the object data in the video data. The data obtaining unit 211 provides the video data and the object data to the memory unit 230 via the control unit 220. The video data are composed of broadcasting data of the terrestrial digital broadcasting (1 seg broadcasting), for example, and the object data are composed of basic image data of the object (for example, a picture of a talent/player/commercial product) and a structural document such as XML and the like including attribute data of the object (for example, attribute information such as name/affiliation of the talent/player/commercial product), for example. Since the object data arrive at the search server on airwaves of the digital broadcasting in the same manner as the video data, the data obtaining unit 211 is an interface device capable of receiving such broadcasting waves. The search information transmission and reception unit 212 receives the search data from the communication terminal 10 via the WAN 50 and provides the search data to the control unit 220. In addition, the search information transmission and reception unit 212 obtains the search result including the object data corresponding to the search data from the control unit 220 and transmits the search result to the communication terminal 10. The search information transmission and reception unit 212 is an interface device such as a telephone line, an optical fiber or any suitable communication interface capable of communicating with the WAN 50.

The control unit 220 has an object recognition unit 221, an object data search unit 222 and a search result creation unit 223. The control unit 220 may be any suitable processer such as the CPU (Central Processing Unit). Each function unit 221 to 223 of the control unit 220 is configured by software executed on the processor or a dedicated processor specialized for processing of each function (for example, GPU (Graphics Processing Unit) and DSP (Digital Signal Processor)).

The object recognition unit 221 obtains the search data, transmitted from the communication terminal 10, from the search information transmission and reception unit 212 and recognizes an object indicated by the user from the search data. The search data includes the indicated coordinate information and the indication timing information in accordance with the user's indication. First, the object recognition unit 221 identifies a frame in the video data indicated by the user, based on the indication timing infatuation included in the search data. Next, the object recognition unit 221 identifies a coordinate in the frame indicated by the user, based on the indicated coordinate information included in the search data. Once the frame and the coordinate indicated by the user are identified, the object recognition unit 221 clips images around the coordinate and performs image processing of edge extraction (a detailed description of the edge extraction is omitted here, as it is a known art in the image processing field). If an object is included in clipped images, the object recognition unit 221 can recognize existence of the object by extracting a contour (edge) of the object by the edge extraction. When recognizing the object, the object recognition unit 211 provides a result of recognition to the object data search unit 222. If not being able to recognize an object, the object recognition unit 221 provides the search result creation unit 223 with a notification that no object can be recognized (hereinafter, referred to as a "recognition error notification") via the object data search unit 222.

The object recognition unit 221 may recognize a plurality of objects as indicated objects by the user. This is because, although the indicated coordinate of search data indicates a single point in the video, there may be a plurality of objects overlaying on the point or a plurality of objects within a predetermined range from the point. If recognizing a plurality of objects, the object recognition unit 221 provides the object data search unit 222 with the result of recognition including all of the objects.

The object data search unit 222 searches for the object data of the object, recognized by the object recognition unit 221, in the memory unit 230. Based on edge information (size, contour shape and the like) of the object extracted and color information of the area of the object, the object data search unit 222 performs matching process of the object with basic image data of each object data stored in the memory unit 230. The matching process is to determine a similarity between the object and the basic image data of object data and performed by maximum likelihood estimation method and the like, for example (since a method to specify an object by the maximum likelihood estimation method and the like is a known art in a recognition processing field, a detailed description thereof is omitted here). If the object data corresponding to the search data is stored in the memory unit 230, the object data search unit 222 provides the object data to the search result creation unit 223. If the object data corresponding to the search data is not stored in the memory unit 230, the object data search unit 222 provides the search result creation unit 223 with a notification indicating that there is no object data (hereinafter, referred to as a "search error notification").

If the object recognition unit 221 recognizes a plurality of objects, the object data search unit 222 obtains object data of each of the plurality of objects from the memory unit 230 and provides the object data to the search result creation unit 223.

The search result creation unit 223 obtains the object data corresponding to the search data of the communication terminal 10 from the object data search unit 222 and creates a search result including the object data. In addition, if receiving the recognition error notification from the object recognition unit 221 or the search error notification from the object data search unit 222, the search result creation unit 223 creates a search result including the error information. The object data creation unit 223 provides the search information transmission and reception unit 212 with the search results.

If the object recognition unit 221 recognizes a plurality of objects, the search result creation unit 223 clips individual images around a position identified by the indicated coordinate information from the frame identified by the indication timing information (hereinafter, referred to as "individual images") and creates the search result including the individual images.

First Embodiment

Figure 4:
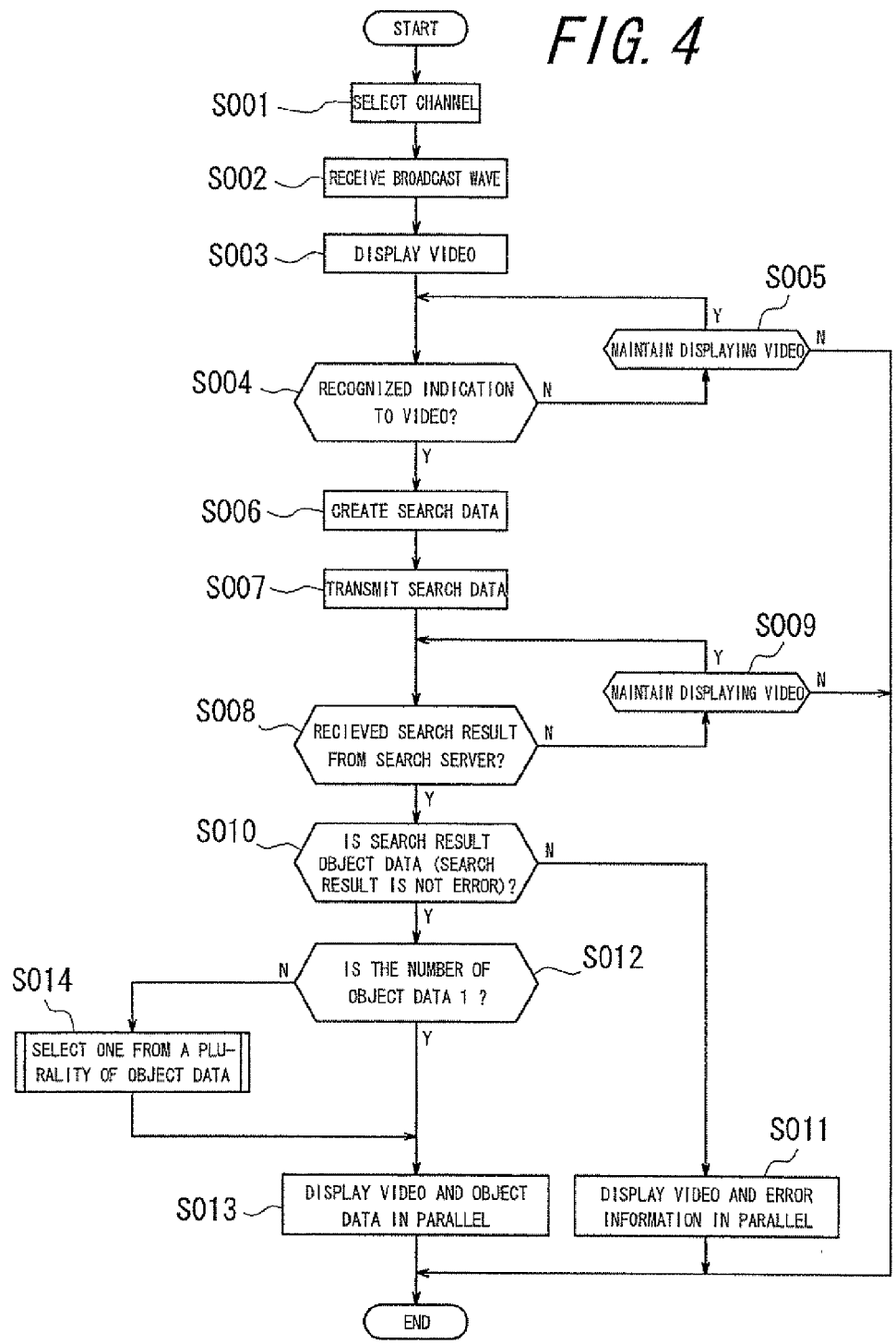
FIG. 4 is a flowchart of operations of the communication terminal according to one embodiment of the present invention.
Figure 5:
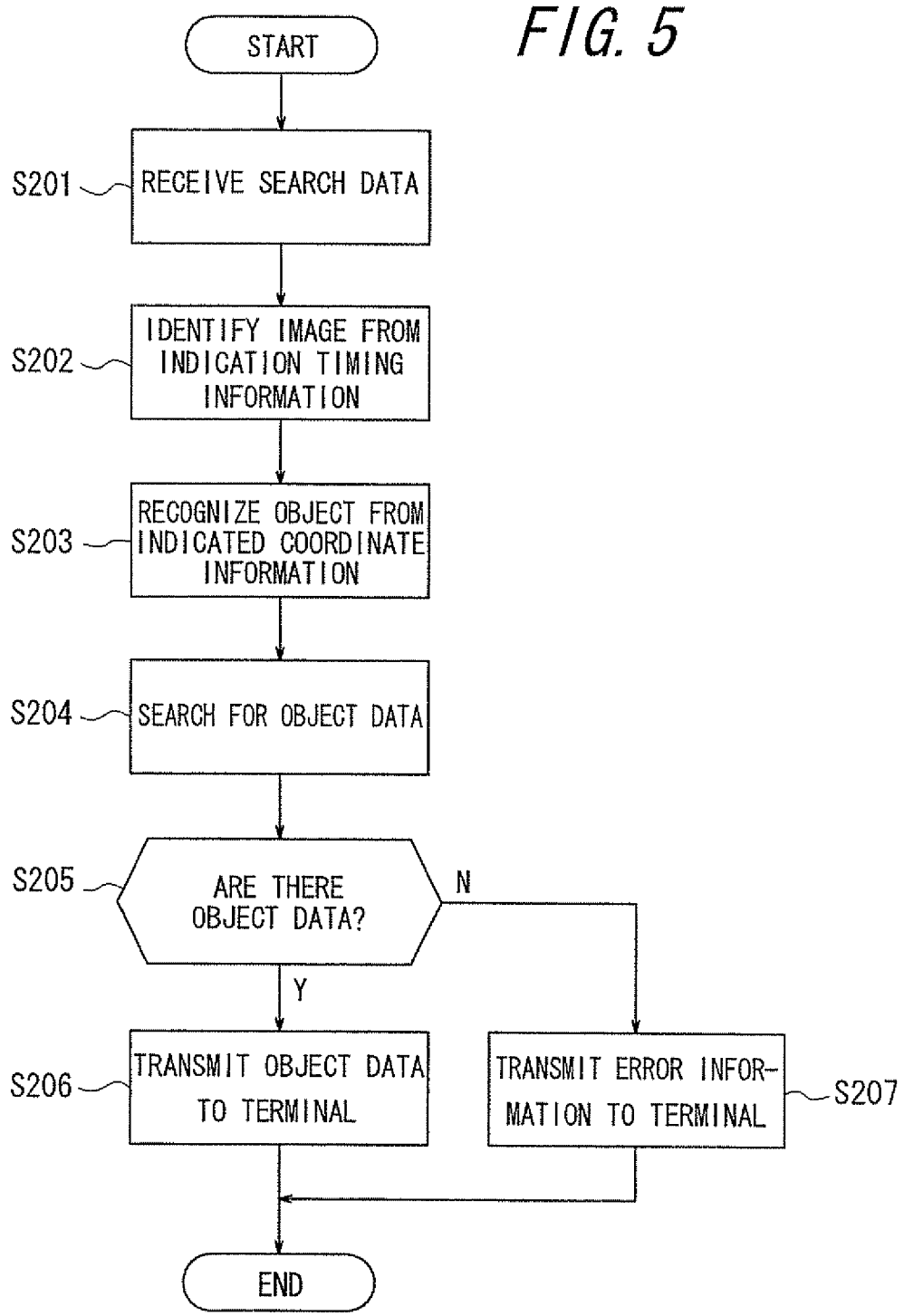
FIG. 5 is a flowchart of operations of the search server according to one embodiment of the present invention.
Figure 6:
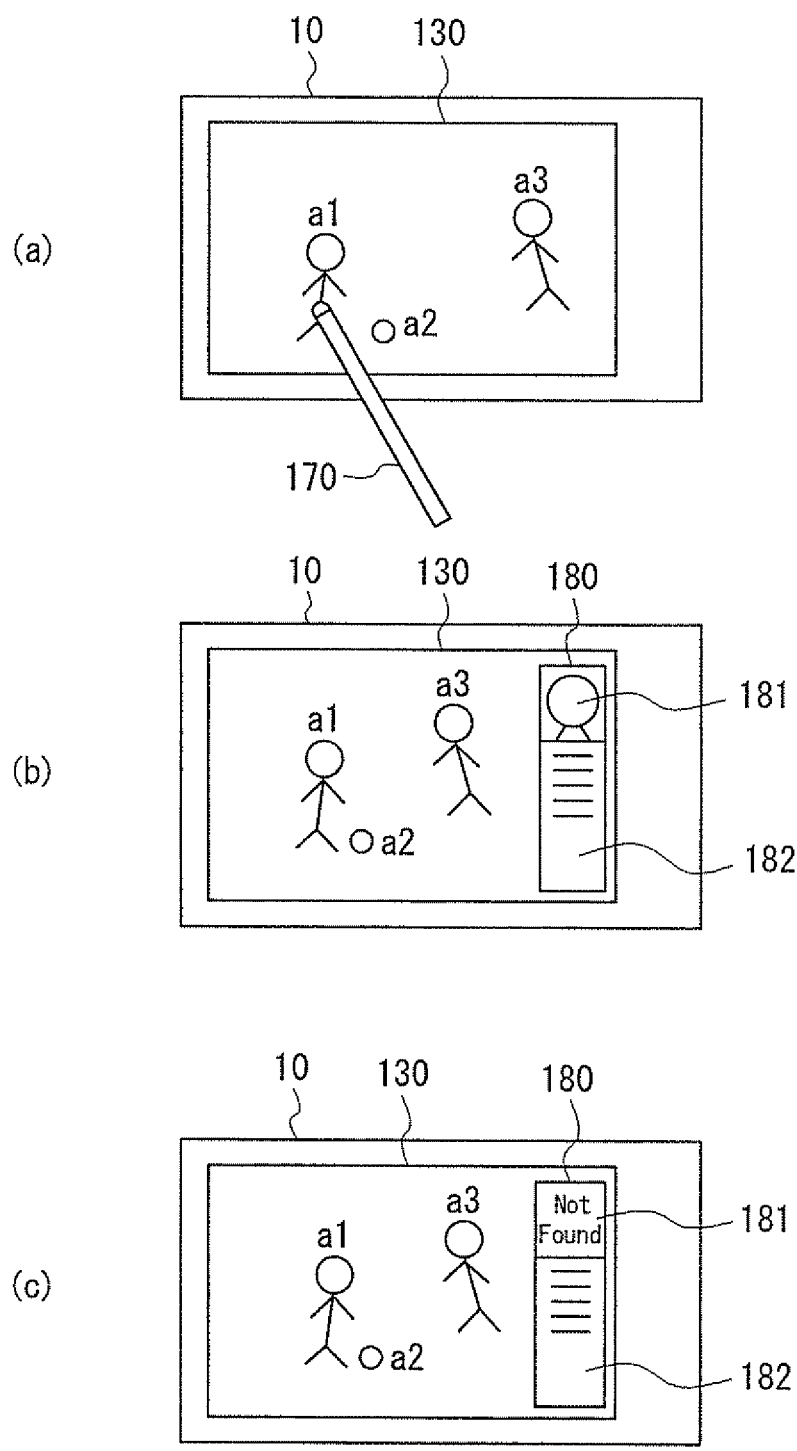
FIG. 6 is a diagram illustrating exemplary displays of a screen of the communication terminal according to a first embodiment of the present invention.

FIG. 4 is a flowchart of operations of the communication terminal 10 according to the embodiment of the present invention, whereas FIG. 5 is a flowchart of operations of the search server 20 according to the embodiment of the present invention. FIG. 6 is a diagram illustrating exemplary displays of the display unit 130 of the communication terminal 10 according to a first embodiment of the present invention. The first embodiment is a case in which the search server identifies a single object data in response to an indication to an image by the user.

When the user selects a channel (S001), the video data reception unit 111 receives broadcasting waves of the channel selected (S002), and the control unit 120 displays the video data, controlled by the video data viewing control unit 124, on the display unit 130 of the communication terminal 10 (S003). If the user desires to know a name of an object shown on the screen or to obtain detailed information of the object while viewing the digital broadcasting by selecting the broadcasting station and receiving the broadcasting waves from the broadcasting station, the user operates to indicate the object by clicking or touching the object. When the user indicates an object a1 on the display unit 130 by using an input device 170 (FIG. 6(a)), the indication recognition unit 121 recognizes an indication to the video by the user (S004). Once recognizing the indication to the video by the user, the indication recognition unit 121 provides the user indication notification to the coordinate obtaining unit 122 and the video data obtaining unit 124. The search data creation unit 125 creates search data including the indicated coordinate information provided from the coordinate conversion unit 123 and the indication timing information provided from the video data viewing control unit 124. The coordinate conversion unit 123 performs coordinate conversion on the indicated coordinate information from a coordinate of the coordinate system of the display unit 130 of the communication terminal 10 to a coordinate of the coordinate system of the video data, in consideration of parameters such as the screen resolution and an aspect ratio and the display mode such as the portrait orientation or the landscape orientation, for example. If there is no indication by the user, it continues to display the video data (S005). Once recognizing an indication to the video by the user, the indication recognition unit 121 provides the search data to the search information transmission and reception unit 112 (S006). The search information transmission and reception unit 112 transmits the search data, provided from the search data creation unit 112, to the search server 20 (S007). As the destination information (address) of the search server 20, it is possible to use an address previously set to each broadcasting station or an address dynamically obtained from addresses of a plurality of search servers.

The memory unit 230 of the search server 20 stores video data and object data of objects included in the video data. The search information transmission and reception unit 212 of the search server 20 receives the search data transmitted by the communication terminal 10 (S201). The search data includes the indicated coordinate information and the indication timing information in accordance with the user's indication. First, the object recognition unit 221 identifies a frame in the video data indicated by the user, based on the indication timing information included in the search data (S202). Next, the object recognition unit 221 identifies a coordinate in the frame indicated by the user, based on the indicated coordinate information included in the search data. Once the frame and the coordinate indicated by the user are identified, the object recognition unit 221 clips an image around the coordinate and recognizes an object by performing the image processing such as the edge extraction (S203). When recognizing the object, the object recognition unit 221 provides the result of recognition to the object data search unit 222, in order to search who or what the object is. If not being able to recognize an object, the object recognition unit 221 provides the search result creation unit 223 with the recognition error notification. The object data search unit 222 searches for the object data of the object, recognized by the object recognition unit 221, in the memory unit 230. If the object data corresponding to the search data are stored in the memory unit 230, the object data search unit 222 provides the object data to the search result creation unit 223. If the object data corresponding to the search data are not stored in the memory unit 230, the object data search unit 222 provides the search result creation unit 230 with the search error notification (S204). The search result creation unit 223 obtains the object data corresponding to the search data of the communication terminal 10, creates the search result including the object data (S206), and transmits the search result to the communication terminal 10 via the search information transmission and reception unit 212. If receiving the recognition error notification from the object recognition unit 221 or the search error notification from the object data search unit 222, the search result creation unit 223 creates a search result including the error notification and transmits the search result to the communication terminal 10 via the search information transmission and reception unit 212 (S207).

If a relationship among the indication timing information, the indicated coordinate information and the object data is stored in the memory unit 230 in advance, the process flow may proceed to step S204, skipping steps S202 and S203, at which the object data search unit 222 may search for the object data corresponding to the indication timing information and the indicated coordinate information in the memory unit 230.

After the communication terminal 10 transmits the search data to the search server 20, the search information transmission and reception unit 112 monitors whether the search result of the search data from the search server 20 is received (S008). If the search result is not received, the communication terminal 10 continues to display the video data (S009). If the search information transmission and reception unit 112 receives the search result from the search server 20, the control unit 120 determines whether the search result includes the object data corresponding to the search data or whether the search result includes the recognition error notification or the search error notification (S010). If the search result includes the object data corresponding to the search data, the control unit 120 then determines whether the search result includes a single object data (S012). If the search result includes a single object data, the control unit 120 displays the object data in an additional window 180 of the display unit 130 (S013, FIG. 6(b)). The additional window 180 includes an image window 181 for displaying a basic image of object data and an attribute window 182 for displaying attribute data of object data. If the search results includes the recognition error notification or the search error notification, the control unit 120 controls the display unit 130 to display "Not Found", which indicates that the object data cannot be found, in the image window 181 of the additional window 180 and a detailed description of such error in the attribute window 182 (S011, FIG. 6(c)).

As described above, according to the present embodiment, since the communication terminal can obtain desired object data from the search server in response to user's indication, the communication terminal can display detailed information of the desired object in the video on the screen, without increasing an amount of distribution data in distribution of the video data.

It is to be noted that the control unit 120 can display the object data on the display unit 130 if the first service identifier and the second service identifier are identical. In such a display mode, the object data are displayed on the display unit 130 only if the first service identifier and the second service identifier are identical to each other. Therefore, it is possible to display only the object data desired by the user.

Second Embodiment

Figure 7:
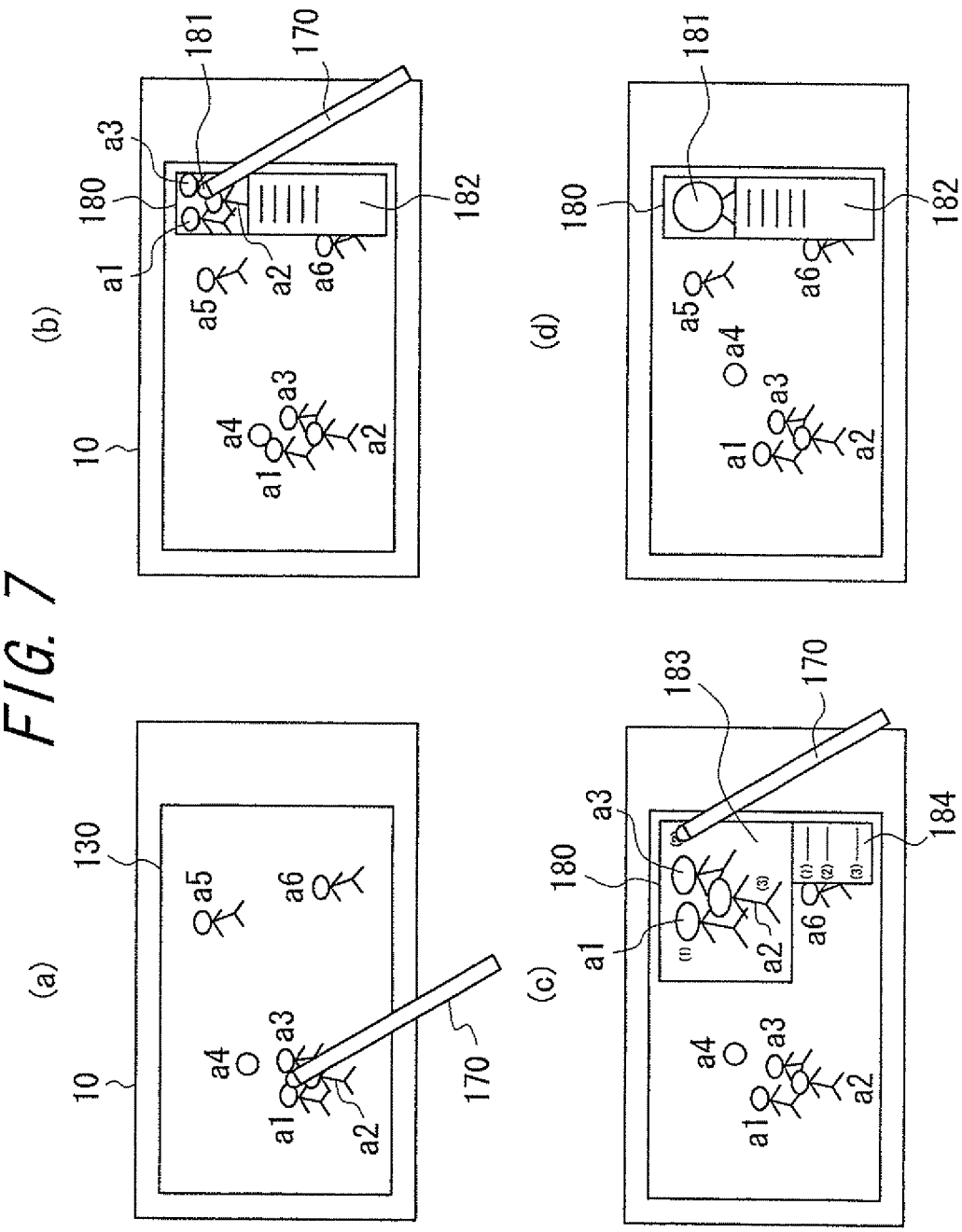
FIG. 7 is a diagram illustrating exemplary displays of a screen of the communication terminal according to a second embodiment of the present invention.

FIG. 7 is a diagram illustrating exemplary displays of the display unit 130 of the communication terminal 10 according to a second embodiment of the present invention. In the second embodiment, the search server identifies a plurality of object data in response to the indication to the video by the user.

If the search server identifies a plurality of object data, the search data are transmitted from the communication terminal 10 to the search server 20 following steps S001 to S007, in the same manner as the first embodiment.

As shown in FIG. 7(a), a plurality of objects a1-a3 is displayed closely around a point indicated by the input device 170. Therefore, the object recognition unit 221 recognizes three objects a1-a3 as indicated objects by the user. Since the object recognition unit 221 recognizes a plurality of objects, the object data search unit 222 obtains object data of each of the plurality of objects a1-a3 from the object data memory unit 230 and provides the object data to the search result creation unit 223. Also, since the object recognition unit 221 recognizes the plurality of objects a1-a3, the search result creation unit 223 clips individual images around the point identified by the indicated coordinate information from a frame identified by the indication timing information, and inserts the individual images into the search result.

If the search result, received by the communication terminal 10, includes a plurality of object data, the control unit 120 displays a screen on the display unit 130 such that the user can select a desired object among the plurality of objects (S014).

Figure 8:
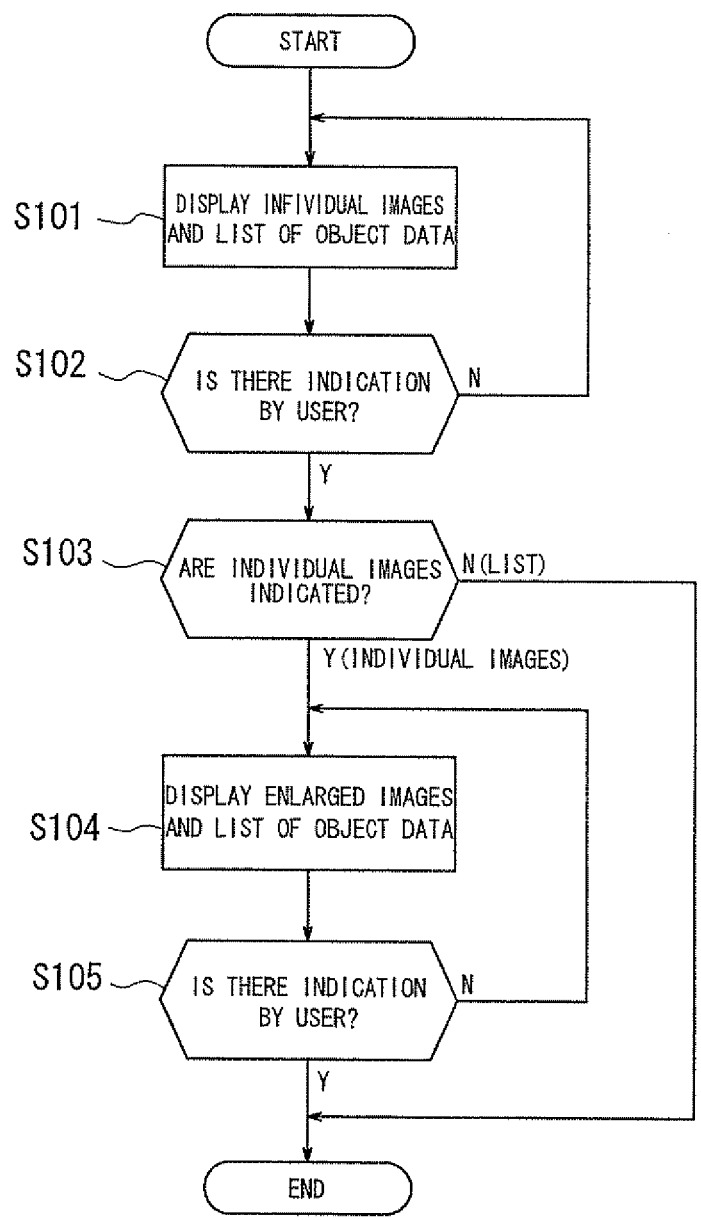
FIG. 8 is a flowchart of operations to select a desired object data from a plurality of object data.

FIG. 8 is a flowchart of detailed operations by the user to select the desired object among the plurality of objects. If the search result includes the plurality of object data, the control unit 120 controls the display unit 130 to display the individual images in the image window 181 of the additional window 180 and a list of the plurality of objects in the attribute window 182 (S101, FIG. 7(b)). The additional window is hidden if there is no indication to the additional window 180 by the user for a predetermined period or if the user explicitly instructs to hide the additional window.

If the user performs indication in the additional window 180 (S102) and the indication is directed to the individual images (S103), the control unit 120 displays enlarged individual images in the enlarged image window 183 and the list of the plurality of objects in the reduced attribute window 184 (S104, FIG. 7(c)). Accordingly, the enlarged image window 183 enables the user to precisely select a desired object among objects closely located to one another. By selecting the desired object in the enlarged image window 183 (S105), the user can obtain attribute information of the desired object (S013, FIG. 7(d)). At this point, the enlarged image window 183 returns to the image window 181 to display the basic image of the object data indicated, while the reduced attribute window 184 returns to the attribute window 182 to display the attribute information of the object data indicated.

In contrast, if the user performs indication in the additional window 180 (S102) and the indication directs not to the enlarged image window 183 but to the list of the plurality of objects in the reduced attribute window 184 (S103), the control unit 120 can identify the object intended by the user clearly from the indication and thus displays the object data corresponding to the indication in the additional window 180 (S013, FIG. 7(d)).

As described above, according to the present embodiment, if the search result includes a plurality of object data, the user can select a desired object among the plurality of objects and display information on the selected object on the screen.

Third Embodiment

A third embodiment shows an exemplary processing of the search server 20 in consideration of a case that the user indicates the video at an unintended timing.

Figure 9:
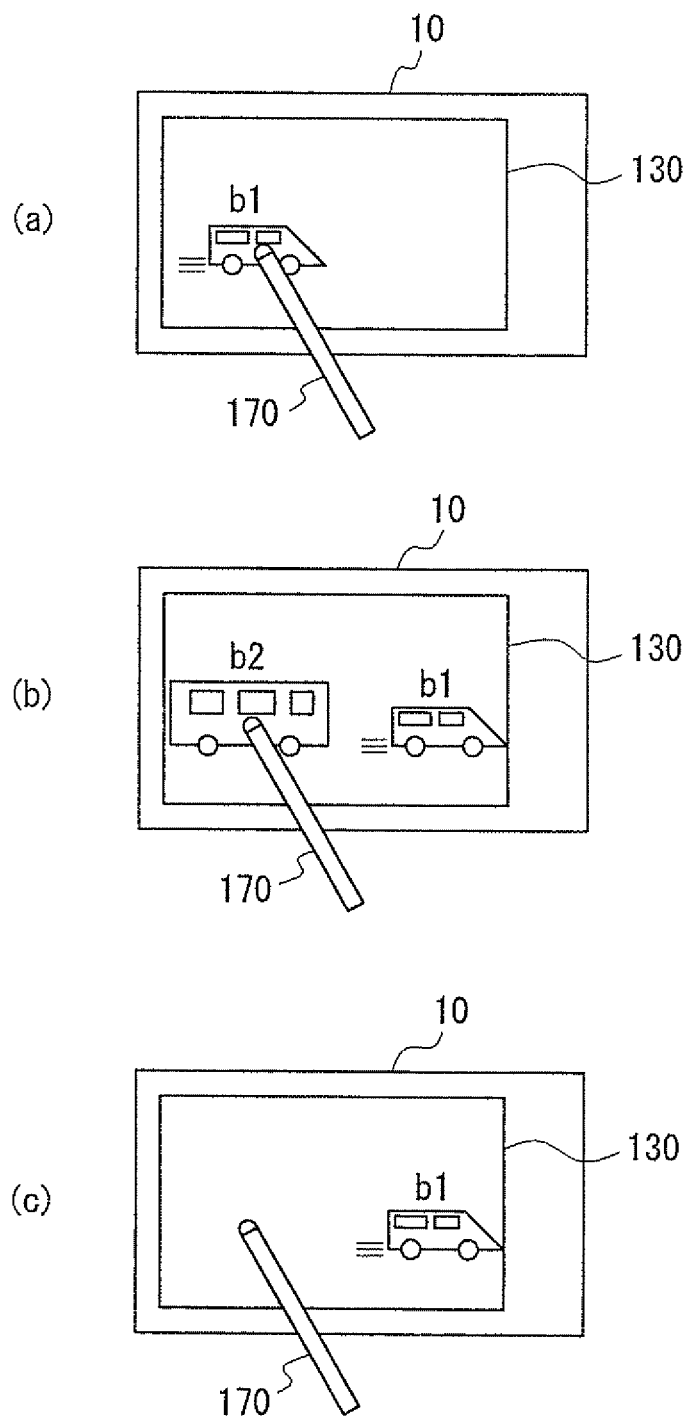
FIG. 9 is a diagram illustrating exemplary cases in which a user indicates at unintended timings.

For example, when the user desires to indicate a fast-moving object or an object displayed immediately before switchover of the screen, it may happen that the user indicates too late against his intention, resulting in that unintended indication timing information of the search data is transmitted from the communication terminal 10 to the search server 20 and thus the search server 20 cannot search for infatuation of the object desired by the user. That is, there may be a case, for example, in which the user indicates an object b2 as shown in FIG. 9(b) against the intention to indicate an object b1 shown in FIG. 9(a), because the object b1 moves too fast for the user to indicate it at a right timing. As a result, the search server 20 transmits the object data of the object b2 to the communication terminal 10, which is not the information desired by the user. There may also be a case, for example, in which the user indicates in an area with no object as shown in FIG. 9(c) against the intention to indicate the object b1 shown in FIG. 9(a), because the object b1 moves too fast for the user to indicate it at the right timing. As a result, the search server 20 transmits error information (recognition error notification) to the communication terminal 10 and the user cannot obtain object data of the object b1.

Figure 10:
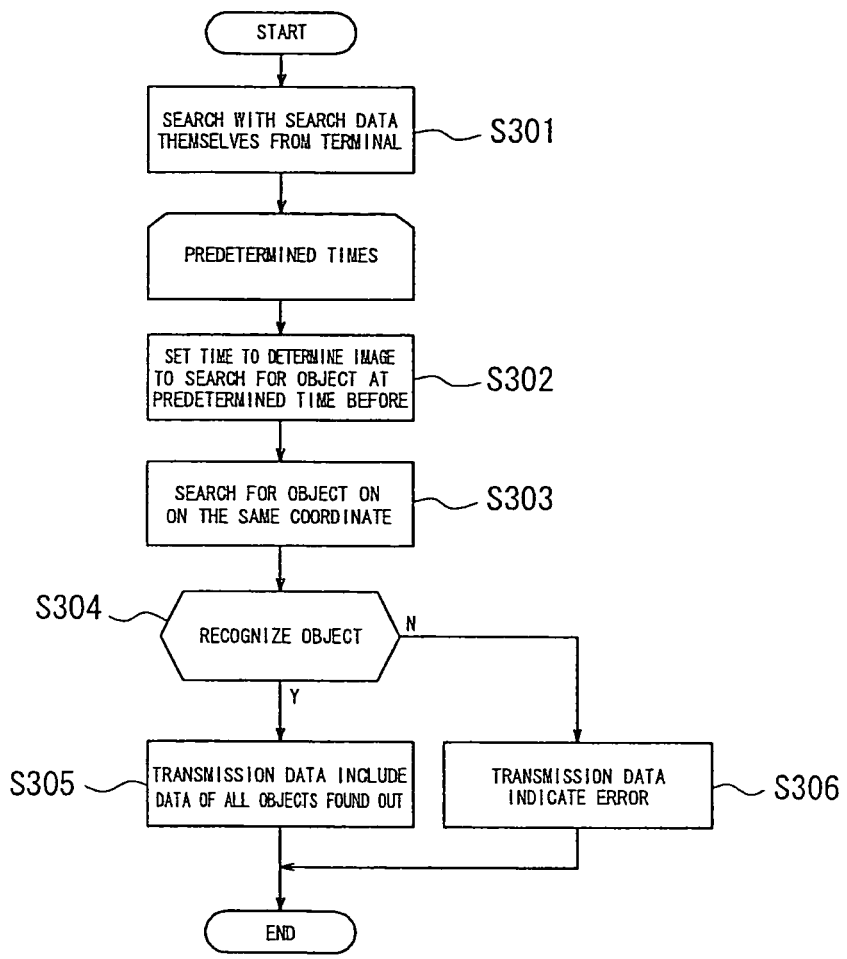
FIG. 10 is a flowchart of operations of a search server according to one embodiment of the present invention.

FIG. 10 is a flowchart of operations of the search server 20 according to the third embodiment of the present invention. In order to deal with the above problems, first, the object recognition unit 221 and the object data search unit 222 of the search server 20 recognize or search for the object data in accordance with the search data transmitted from the communication terminal 10 (S301). Recognition and search for the object data are performed in the same manner as steps S202-204 shown in FIG. 5. Next, the object recognition unit 221 of the search server 20 recognizes the object data corresponding to a coordinate, specified by the indicated coordinate information included in the search data, in an image displayed at a predetermine time before the indication timing information included in the search data. The object data search unit 222 receives a result of recognition by the object recognition unit 221 and searches for the object data (S302, S303). Recognition and search for the object data of the image displayed at the predetermine time before are performed predetermined number of times. If data of one or more objects are recognized and searched at step S301, the number of times to repeat steps S302, S303 may be set zero (in other words, steps S302 and S303 may be skipped). If the object recognition unit 221 and the object data search unit 222 of the search server 20 succeed in recognition of and search for one or more objects at steps S301 to S303 (Yes of S304), the search result creation unit 223 of the search server 20 obtains the object data corresponding to the search data of the communication terminal 10 from the object data search unit 222, creates a search result including data of all of the objects (S305) and transmits the search result to the communication terminal 10 via the search information reception unit 212. In contrast, if the object recognition unit 221 and the object data search unit 222 of the search server 20 fails to recognize or search for one or more objects (No of S304), the search result creation unit 223 obtains the recognition error notification from the object recognition unit 221 or the search error notification from the object data search unit 222, creates a search result including the error notifications and transmits the search result to the communication terminal 10 via the search information transmission and reception unit 212 (S306).

With regard to the number of a plurality of object data to be transmit to the communication terminal 10 and the selection method at step S305, it is possible to prioritize the objects in accordance with the number of times for the object to be recognized (for example, the object has a higher priority as the number of times to be recognized is greater) and a predetermined number of object data in order of priority are included in the search result, at the object recognition steps S301 to S303, for example. In addition, a length of a time before the indication timing information to search for an image may be determined based on a timing of switchover of the screen (for example, a time at which a screen composition or angle of the video changes) or a time normally taken by the user to indicate an object after viewing it. Moreover, a loop of steps S302 and S303 may be repeated until one object is found. In this case, if the object recognition unit 221 and the object data search unit 222 succeed in recognizing or searching for the object by using the search data, recognition of the object is not performed at second time and thereafter. Alternatively, if the object recognition unit 221 and the object data search unit 222 try to recognize or search for an object in an image displayed at the predetermined time before only once and succeed in recognizing or searching for the object as a result but the object is different from the one recognized by using the search data, the search server 20 may transmit data of both objects to the communication terminal 10.

Instead of that the search server 20 voluntarily recognizes and searches for an object of an image before the indication timing information included in the search server, the search data creation unit 125 of the communication terminal 10 may create search data, in advance, including a plurality of indication timing information indicating times before the user's indication. In this case, the search server 20 recognizes and searches for the object based on each of the plurality of indication timing information included in the search data.

As described above, according to the present embodiment, since the search server recognizes an object corresponding to an indication to the video based on the timing information indicating a time before the indication timing information included in the search data and the indicated coordinate information, it is possible to recognize and search for the object data of the object desired by the user, even if the user indicates the video at an unintended timing. In addition, since the search data includes a plurality of indication timing information indicating times before the indication, the communication terminal can instruct the search server to recognize the object of an image distinctly before a point of the user's indication.

Fourth Embodiment

The fourth embodiment is to deal with a case in which an indication to the video by the user is in the form of "circle" or "line" in addition to "point".

Figure 11:
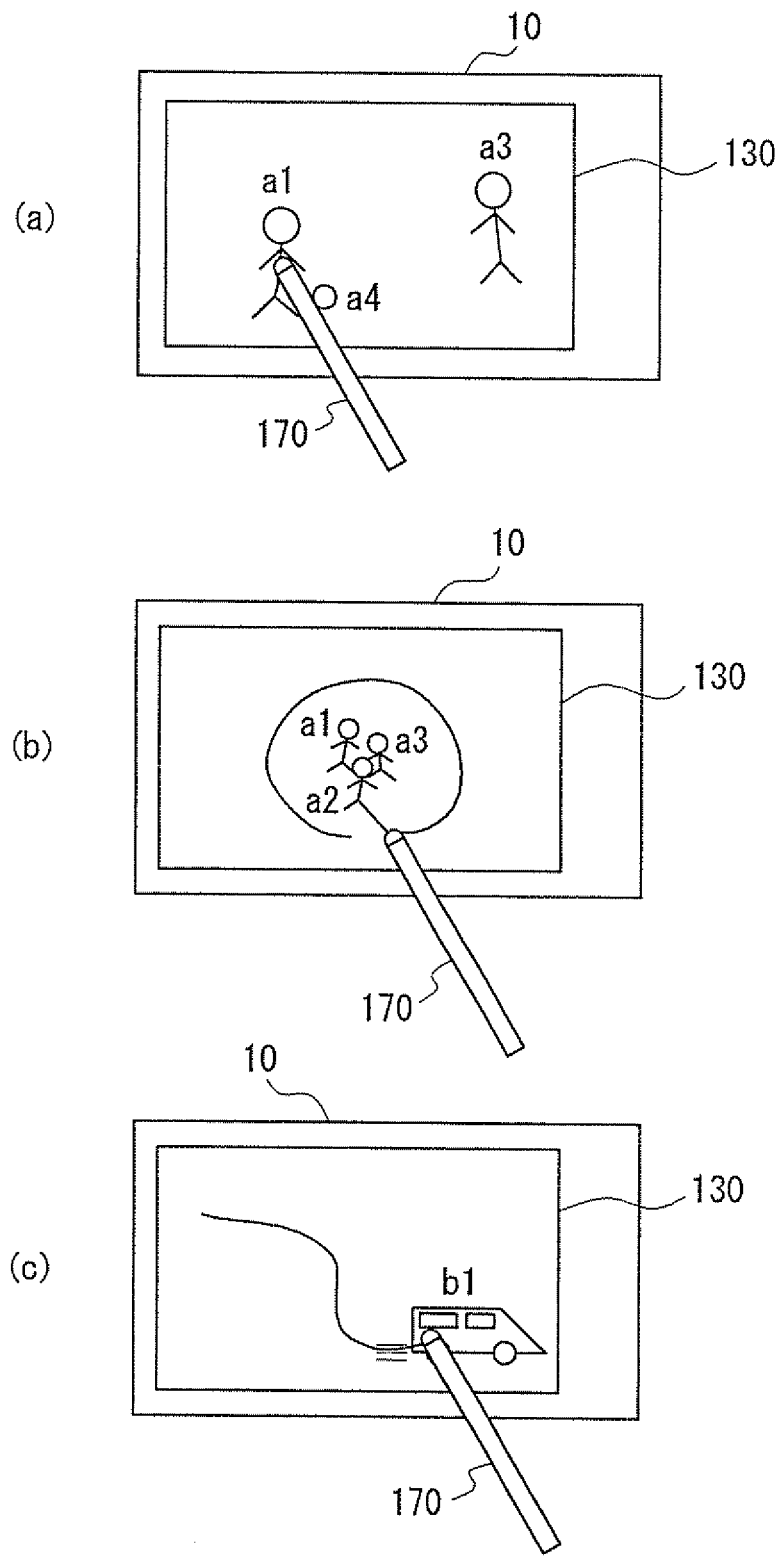
FIG. 11 is a diagram illustrating examples of continuous indications by the user.

Indication to the display unit 130 is performed by the user for a period from when a pen and the like touches the display unit to when it moves away from the display unit. The indication recognition unit 121 of the communication terminal 10 can recognize the indication continuously during such movement. In this case, not only a "point" as shown in FIG. 11(a) but also a "circle" collectively indicating objects as shown in FIG. 11(b) and a "line" indicating an object following a movement thereof as shown in FIG. 11(c) may be used as indication methods.

Figure 12:
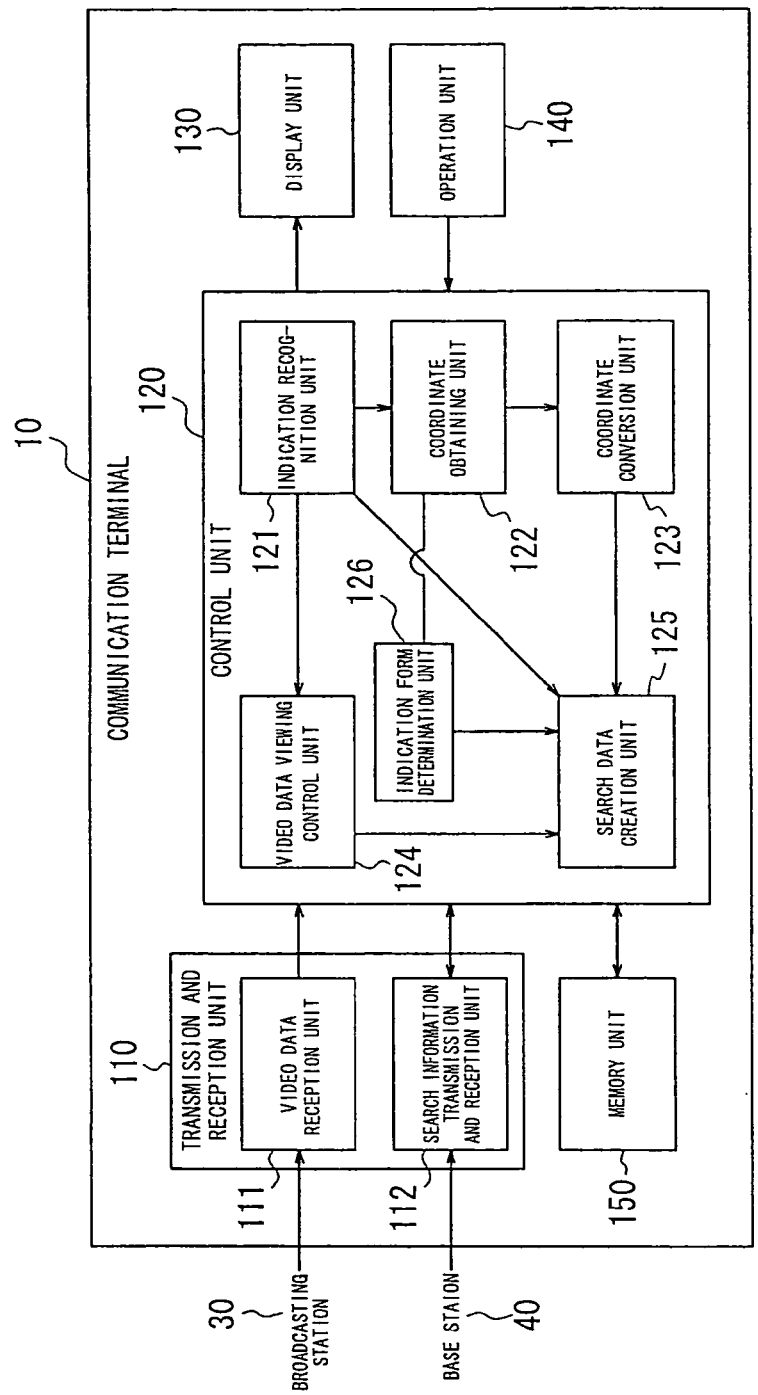
FIG. 12 is a functional block diagram illustrating a schematic constitution of a communication terminal according to one embodiment of the present invention.

FIG. 12 is a functional block diagram illustrating a schematic constitution of the communication terminal 10 according to the fourth embodiment of the present invention. The communication terminal 10 shown in FIG. 12 includes an indication form determination unit 126 in addition to the constitution shown in FIG. 1. Functional blocks with the same reference signs as those in FIG. 1 have the same functions.

Figure 13:
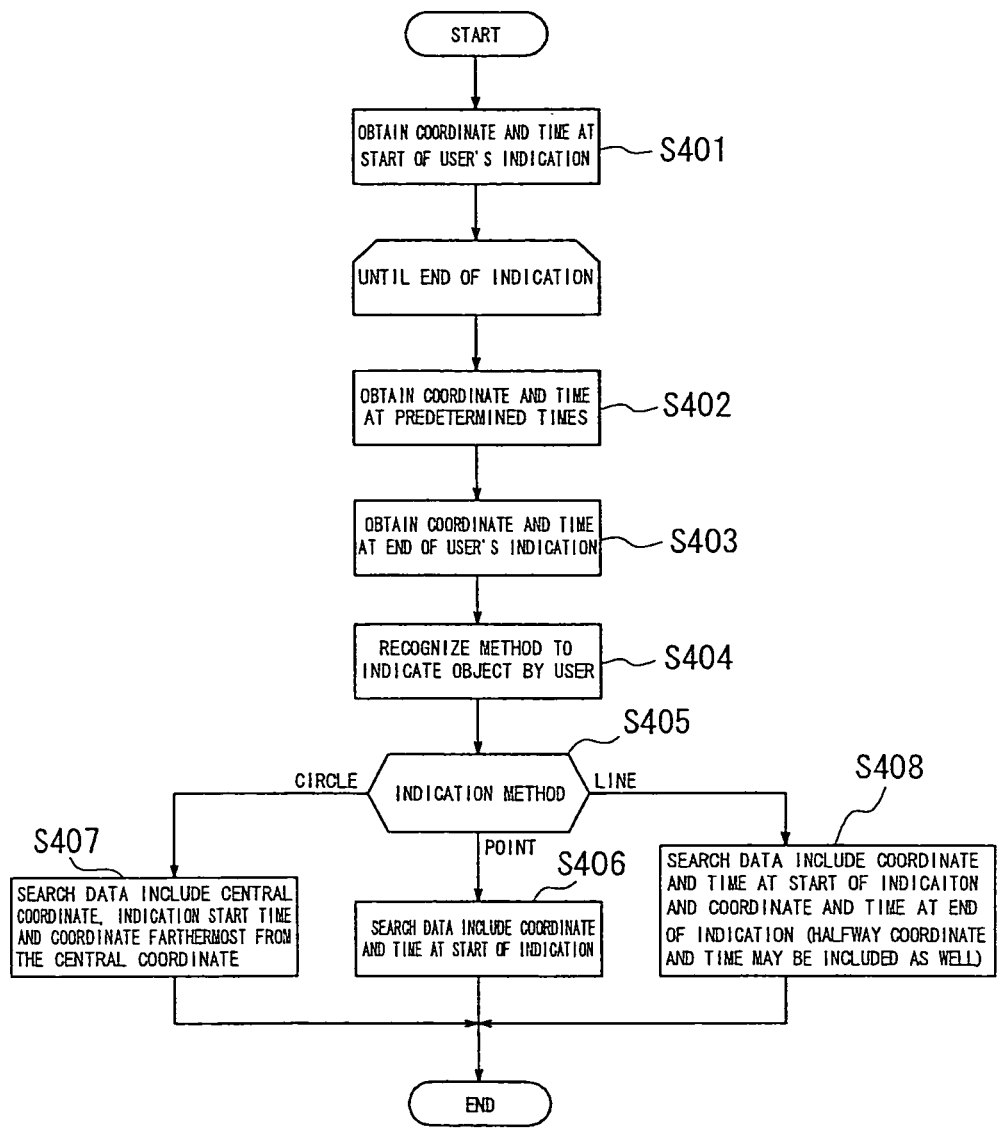
FIG. 13 is a flowchart of operations of the communication terminal according to one embodiment of the present invention.

FIG. 13 is a flowchart of operations of the communication terminal 10 according to the fourth embodiment of the present invention, in response to a variety of indication forms in processing at step S006 shown in FIG. 4. When the indication recognition unit 121 of the communication terminal 10 recognizes an indication of the user, the coordinate obtaining unit 122 obtains indicated coordinate information (coordinate at start of indication) of the user, whereas the video data viewing control unit 124 obtains indication timing information (indication start time) (S401). If the indication by the user is continuously performed on the display unit for a predetermined period, such as a case when an indication by the user is a "circle" or a "line", the coordinate obtaining unit 122 obtains indicated coordinate information of the user at predetermined intervals until the user ends indication, while the video data viewing control unit 124 obtains indication timing information (S402). When the user ends indication, the coordinate obtaining unit 122 obtains indicated coordinate information (coordinate at end of indication) of the user again, while the video data viewing control unit 124 obtains indication timing information (indication end time) (S403).

Subsequently, when the user ends the indication, the indication form determination unit 126 determines which one of the "point", "circle" and "line" the indication method is, by using image recognition based on a locus of the indicated coordinate information obtained (S404). Information included in the search data created by the search data creation unit 125 differs for each indication form determined by the indication form determination unit 126. If the indication form is the "point", the search data creation unit 125 includes the coordinate at start of indication and the indication start time in the search data (S406). If the indication form is "circle", the search data creation unit 125 includes a central coordinate of the circle, calculated based on the locus of the indicated coordinate information obtained, the indication start time and indicated coordinate information of the farthermost indication from the central coordinate in the search data (S407). If the indication form is "line", the search data creation unit 125 includes a combination of the coordinate at start of indication and the indication start time and a combination of the coordinate at end of indication and the indication end time in the search data (S408). Especially, if the indication form is the "line", the search data creation unit 125 may add a plurality of coordinate information and time information for describing the locus of the line in more detail in the search data. It is to be noted that the central coordinate of the circle may be obtained from an intersection of perpendicular bisectors to two lines connecting any three coordinates.

Figure 14:
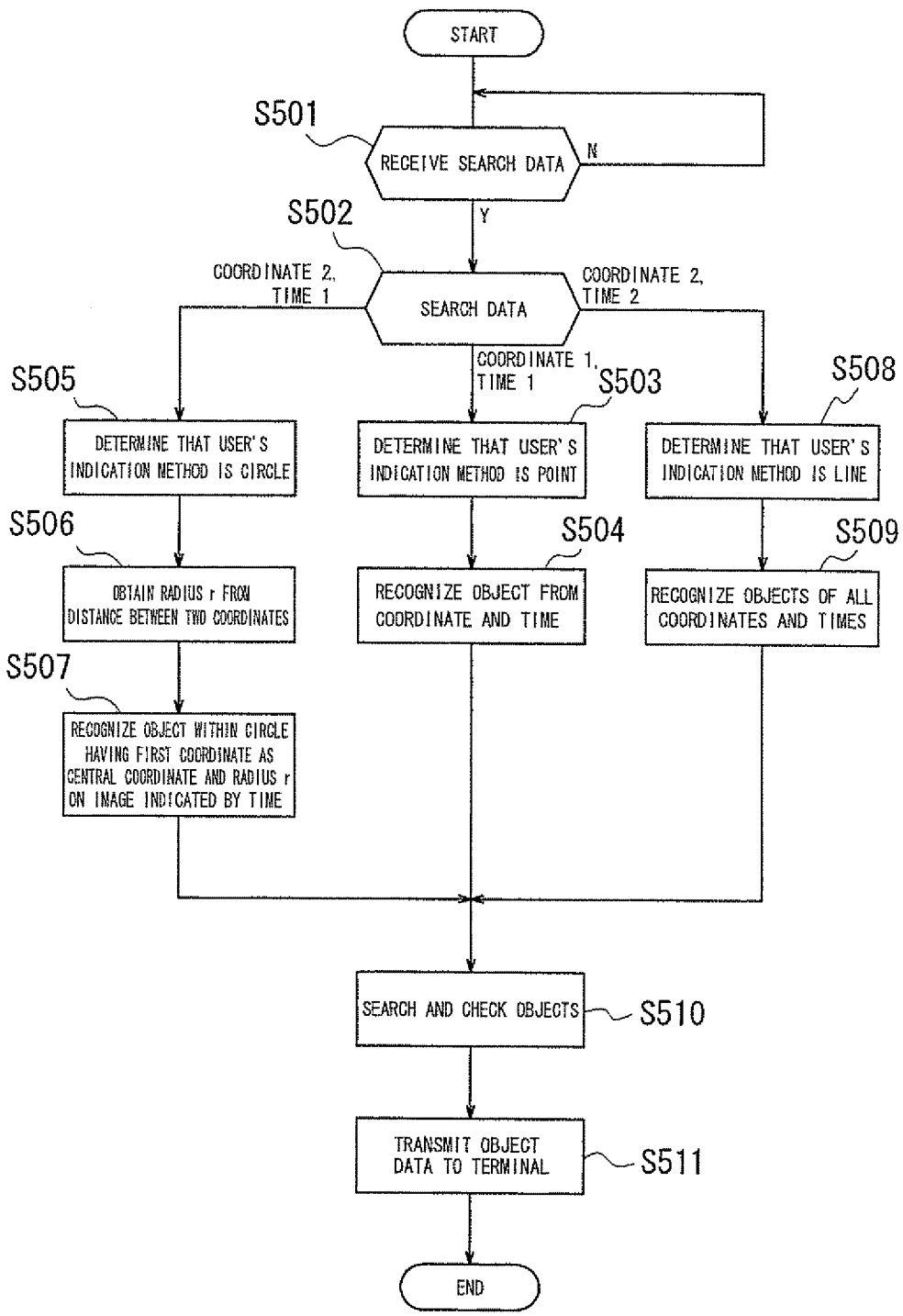
FIG. 14 is a flowchart of operations of the search server according to one embodiment of the present invention.

FIG. 14 is a flowchart of operations of the search server 20 according to the fourth embodiment of the present invention. When the search information transmission and reception unit 212 of the search server 20 receives the search data from the communication terminal 10 (S501), the control unit 220 determines a form of the indication to the communication terminal 10 by the user based on the search data (S502). If the search data includes only a single pair of the indicated coordinate information and the indication timing information, the control unit 220 determines that the indication form is "point" (S503), and the object recognition unit 221 recognizes an object at a position according to indicated location coordinate information in an image identified by the indication timing information (S504). If the search data includes two indicated coordinate information and one indication timing information, the control unit 220 determines that the indication form is "circle" (S505) and obtains a radius r of the circle based on a distance between two indicated coordinate information (S506), and the object recognition unit 221 recognizes an object within the radius R from a first coordinate (central coordinate) as a center in the image identified by the indication timing information (S507). If the search data includes two (or more) combinations of the indicated coordinate information and the indication timing information, the control unit 220 determines that the indication form is "line" (S508), and the object recognition unit 221 obtains a start and an end (and a pass point as well) of the line based on each of the indicated coordinate information and the indication timing information, calculates a locus of the line, and recognizes objects along the line (S509). Step S510 to search and check the object and step S511 to transmit the object data are performed in the same manner as steps S204 to S207 in FIG. 5.

With regard to the number of a plurality of object data to be transmit to the communication terminal 10 and the selection method thereof at step S511, it is possible to prioritize the objects in accordance with the number of times for the object to be recognized (for example, the object has a higher priority as the number of times to be recognized is greater) and a predetermined number of object data in order of priority are included in the search result, at the object recognition step S510, for example.

Although a point, a circle and a line are used as the indication method in the above embodiment, the indication form determination unit 126 may be configured to recognize forms such as triangle and quadrangle. For example, if the indication form is a triangle, the search data creation unit 125 may include a coordinate of each vertex of the triangle and the indication start time in the search data. If the indication form is a quadrangle, the search data creation unit 125 may include a coordinate of each vertex of the quadrangle and the indication start time in the search data. It is possible to determine the timing when the indication recognition unit 121 recognizes an intersection of the locus of indication continuously performed as the end of the indication at step S402 shown in FIG. 13. In addition, the search data creation unit 125 may include information indicating what the indication form is in the search data. In this case, the search server 20 can confirm the indication form by referring to the information. The indication form determination unit 126 may determine a form of a figure (circle, triangle and the like) when the indication recognition unit 121 recognizes the intersection of the locus of the continuous indication by the user. It is also possible that the communication terminal 10 does not recognize the form of the user's indication but instead transmits all of the coordinates and times obtained by the communication terminal 10 to the search server 20 successively or at the end of indication and the search server 20 determines the form of the user's indication through image recognition by drawing a locus based on the information and the like. Moreover, the search data creation unit 125 may indicate an object not with the locus but with an area surrounded by a plurality of successive points. In this case, the indication recognition unit 121 and the indication form determination unit 126 perform determination processing to determine the area after the user indicates a last point. In this case, the communication terminal 10 may transmit either the search data collecting the indicated coordinate information in the area or a combination of indicated coordinate information and indication timing information consecutively or at predetermined intervals, to the search server 20.

As described above, according to the present invention, if there are continuous indications to the image of the communication terminal, since the search data including the indicated coordinate information and the indication timing information based on each of the continuous indications are transmitted to the search server, it increases the possibility that the server can recognize and search for an object based on the indicated coordinate information and the indication timing information based on each of the continuous indications and, as a result, obtain object data of the object desired by the user. In addition, if the continuous indications form a figure such as a point, a circle and a line, since the communication terminal includes the indicated coordinate information and the indication timing information corresponding to the figure in the search data and the search server searches based on the form, it enables to effectively search for and obtain the object desired by the user.

Fifth Embodiment

In fifth embodiment, when the user indicates to the video continuously and such continuous indications specifies a bounded region (continuous indications have an intersection), information on the bounded region is included in the search data.

Figure 15:
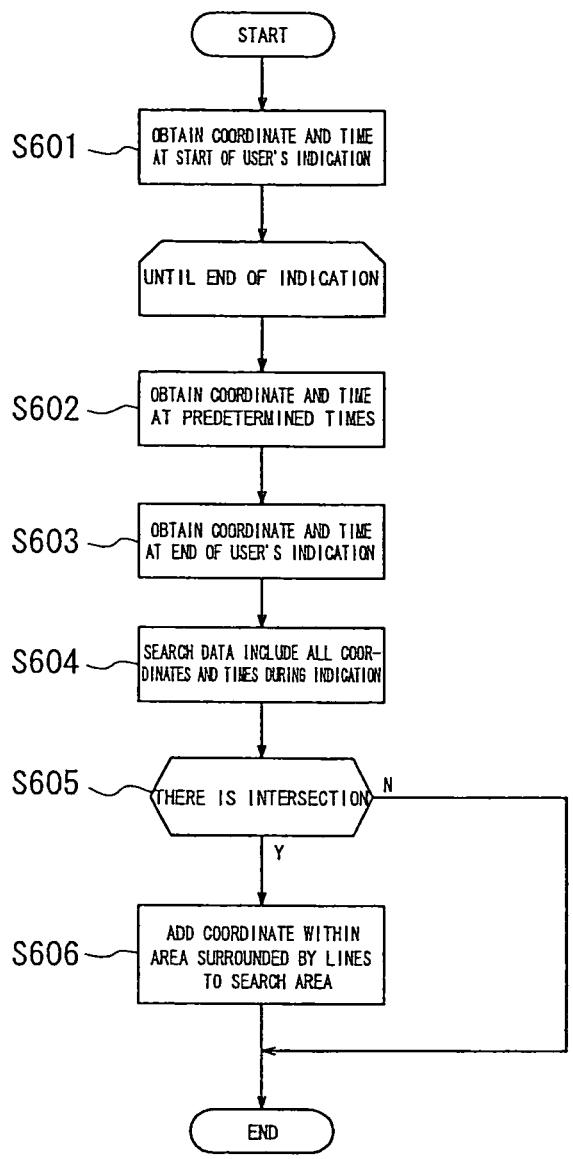
FIG. 15 is a flowchart of operations of the communication terminal according to one embodiment of the present invention.

FIG. 15 is a flowchart of operation of the communication terminal 10 according to the fifth embodiment of the present invention, in response to whether the continuous indications have an intersection in processing at step S006 shown in FIG. 4. When the indication recognition unit 121 of the terminal 10 recognizes an indication by the user, the coordinate obtaining unit 122 obtains indicated coordinate information (coordinate at start of indication), while the video data viewing control unit 124 obtains indication timing information (indication start time) (S601). If the user continuously performs indication to the display unit for a predetermined period, the coordinate obtaining unit 122 obtains indicated coordinate information at predetermined intervals until the user ends the indication, while the video data viewing control unit 124 obtains indication timing information (S602). When the user ends the indication, the coordinate obtaining unit 122 obtains indicated coordinate information (coordinate at end of indication), while the video data viewing control unit 124 obtains indication timing information (indication end time) (S603). The search data creation unit 125 creates search data including all of the indicated coordinate information and the indication timing information from the coordinate at start of indication to the coordinate at end of indication and from the indication start time to the indication end time (S604). The indication recognition unit 121 determines whether there is an intersection of a locus of the continuous indications, by referring to a result of recognition of the coordinates by the coordinate recognition unit 122 (S605). If there is an intersection of the locus of the continuous indications, the search data creation unit 125 adds the indicated coordinate information within the range surrounded by the locus to the search data (S606).

Figure 16:
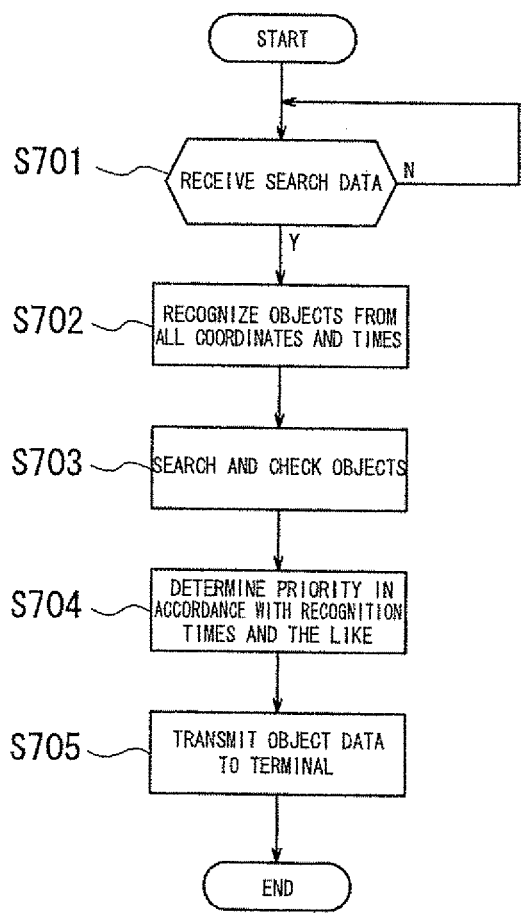
FIG. 16 is a flowchart of operations of the search server according to one embodiment of the present invention.

FIG. 16 is a flowchart of operations of the search server 20 according to the fifth embodiment of the present invention. When the search server 20 receives the search data (S701), the object recognition unit 221 and the object data search unit 222 recognize or search for object data in accordance with all of the indicated coordinate information and the indication timing information included in the search data transmitted from the communication terminal 10 (S702 to S703). Such recognition and search for the object data are performed in the same manner as steps S202 to 204 shown in FIG. 5. The search result creation unit 223 obtains the object data corresponding to the search data of the communication terminal 10 from the object data search unit 222 and creates a search result including all of the object data (S704). At objet recognition steps S702 to S703, for example, the search result creation unit 223 determines priority of the objects in accordance with the number of times for each of the objects to be recognized (for example, the object has a higher priority as the number of times to be recognized is greater) and a predetermined number of object data in order of priority are included in the search result. The search server 20 transmits the search result to the communication terminal 10 via the search information transmission and reception unit 212.

According to the present embodiment, if the indication to the communication terminal is continuously made, and a locus of indicated coordinates has an intersection, the search data includes indicated coordinate information on a range surrounded by the locus of the coordinates of the continuous indications and indication timing information corresponding to the continuous indications. Thereby, the communication terminal can transmit an exhaustive range which may include an object desired by the user to the search server and, as a result, it improves a probability of obtaining the object data desired by the user.

Sixth Embodiment

According to a sixth embodiment, the operation unit (indication input unit) of the communication terminal is a remote operation terminal, such as a remote controller, and it is possible to remotely operate the communication terminal with the remote operation terminal.

Figure 17:
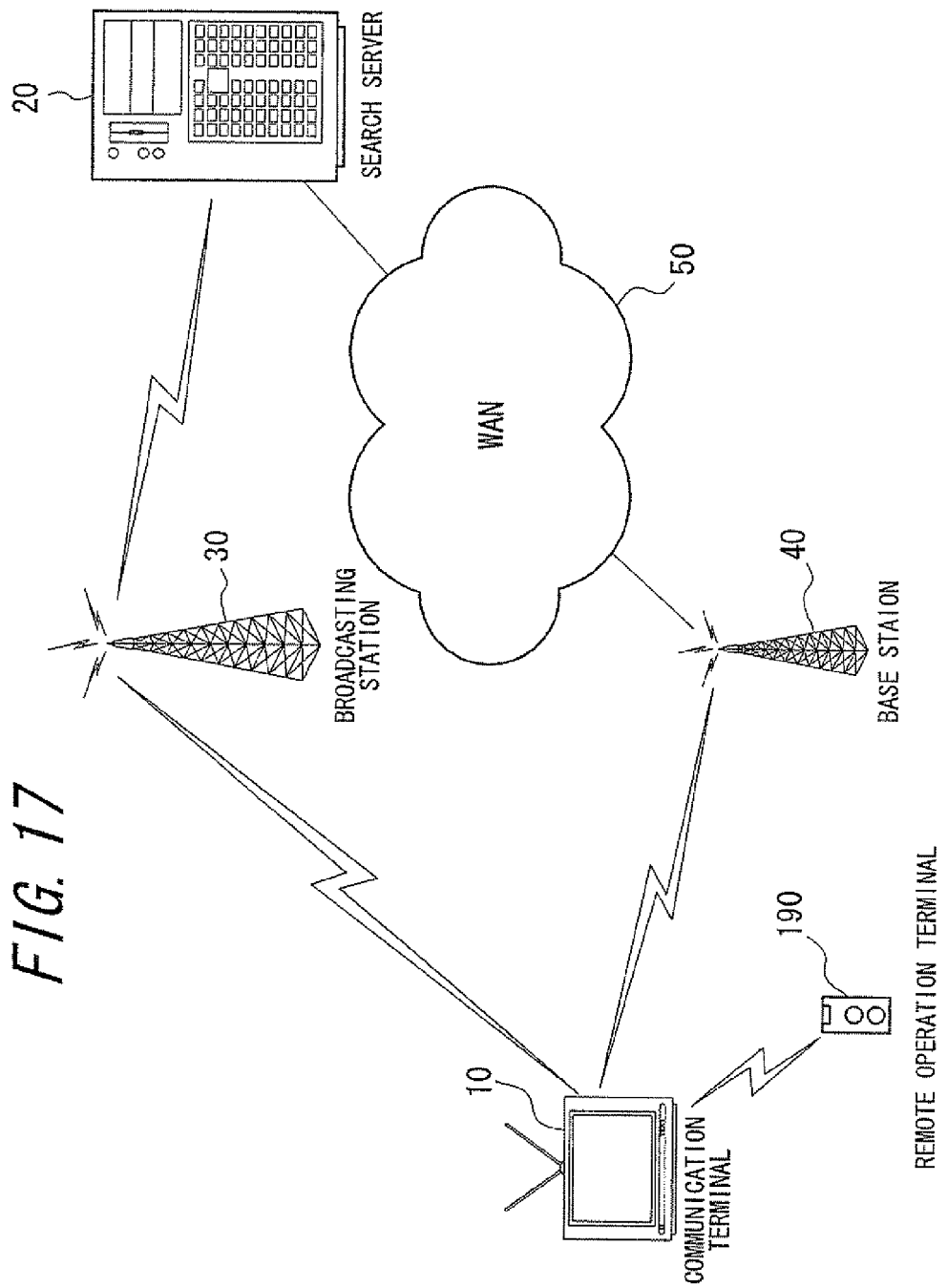
FIG. 17 is a diagram illustrating a schematic constitution of a communication network a communication terminal according to one embodiment of the present invention can use.

FIG. 17 is a diagram illustrating a schematic constitution of a communication network according to the sixth embodiment of the present invention. In FIG. 17, the communication terminal 10 can be remotely operated by the remote operation terminal 190, and the search server 20, the broadcasting station 30, the base station 40 and the WAN are similarly configured to those shown in FIG. 1. The communication terminal 10 and the base station 40 may communicate with each other by using any wired or wireless communication scheme such as a wired LAN, the wireless LAN, mobile communication wireless network (cdma2000 EV-DO, iBurst (registered trademark), WiMAX (registered trademark), LTE (Long Term Evolution)) and the like, for example. In addition, the broadcasting station 30 and the search server 20 may be connected via a wire, through which digital broadcasting may be transmitted and received.

Figure 18:
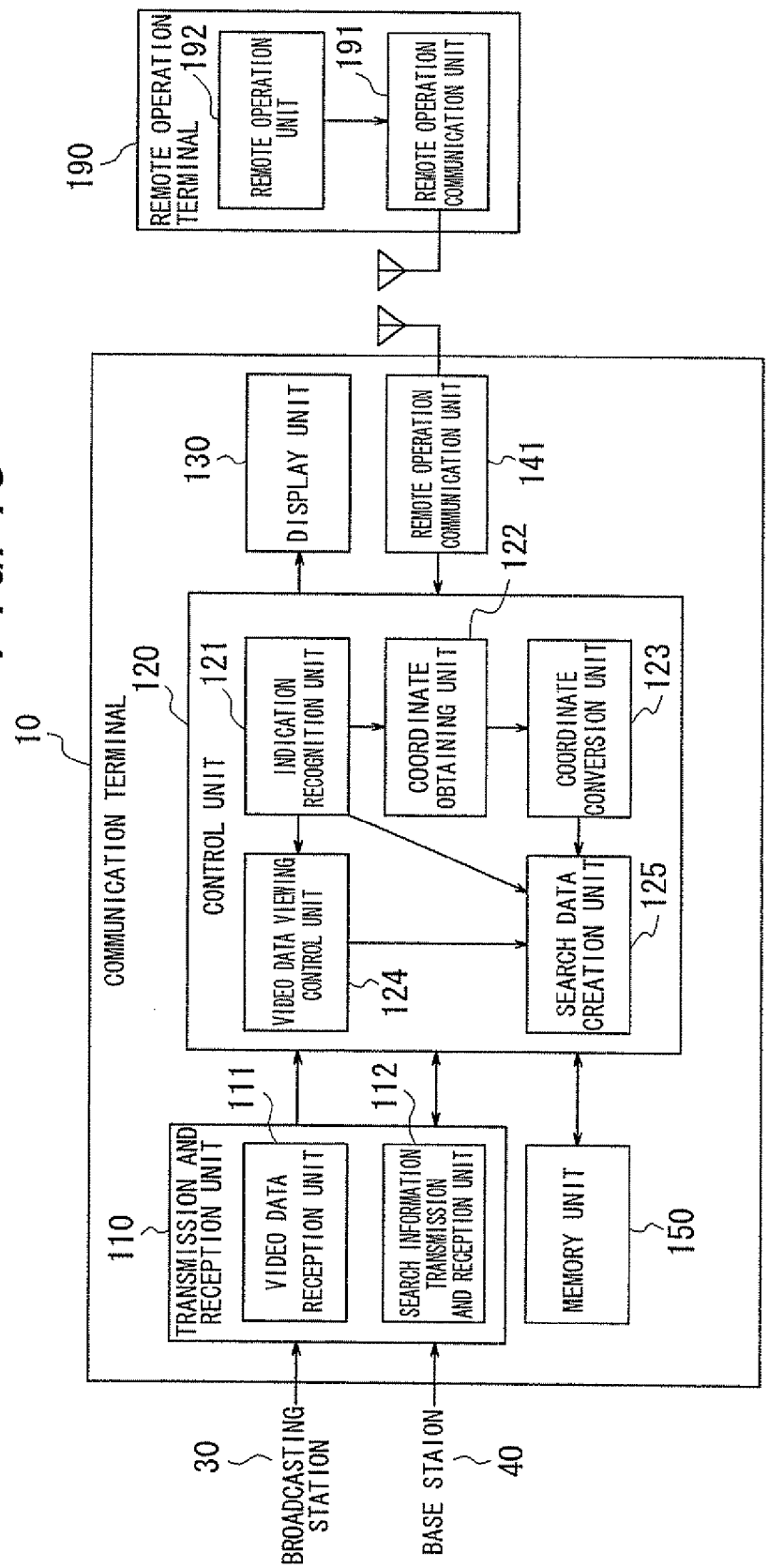
FIG. 18 is a functional block diagram illustrating schematic constitutions of the communication terminal and a remote operation terminal according to one embodiment of the present invention.

FIG. 18 is a functional block diagram illustrating schematic constitutions of the communication terminal 10 and the remote operation terminal 190 according to the sixth embodiment of the present invention. As shown in FIG. 18, the communication terminal 10 has a remote operation communication unit 141 instead of the operation unit 140 in FIG. 1 and can be remotely operated by the remote operation terminal 190. Functional blocks with the same reference signs as those in FIG. 1 have the same functions.

The remote operation terminal 190 has a remote operation communication unit 191 (second remote operation communication unit) for communicating with the remote operation communication unit 141 of the communication terminal 10 and the remote operation unit 192 to be used by the user to indicate an object on the display unit 130 and perform indication input. Each of the remote operation communication unit 141 and the remote operation communication unit 191 may be constituted of an interface device corresponding to any suitable Near Field Communication such as an infrared communication, the wireless LAN, Bluetooth (registered trademark) and the like. The remote operation unit 192 may be any suitable pointing device such as a touch panel and the like. The remote operation unit 192 may be able to remotely operate with an acceleration sensor, an angular speed sensor, an oscillation sensor, a slope sensor and the like in response to a user's intuitive move such as shaking the remote operation terminal 190.

Here, the remote operation terminal 190 may be either a terminal, such as a general remote controller, dependent on the communication terminal 10 or a terminal, such as a mobile phone, PDA and the likes, independent from the communication terminal 10.

If the remote operation terminal 190 is a terminal dependent on the communication terminal 10, the communication terminal 10 may include the remote operation communication unit 141 and the remote operation terminal 190. It is to be noted that the communication terminal 10 may further include the operation unit 140 in that case.

According to the sixth embodiment, processing of the communication terminal 10 and the search server 20 is performed basically according to the first embodiment (steps S001 to 013, steps S201 to 207), except for step S004 by the communication terminal 10.

At step S004 according to the sixth embodiment, if the user desires a name or detailed information of an object displayed on the display unit 130, the user operates to indicate the object by operating the remote operation unit 192 of the remote operation terminal 190. When the user indicates the object on the display unit 130 by operating the remote operation unit 192 of the remote operation terminal 190, the remote operation communication 191 of the remote operation terminal 190 transmits information on such indication to the remote operation communication unit 141 of the communication terminal 10, thereby the indication recognition unit 121 can recognize such indication.

Figure 19:
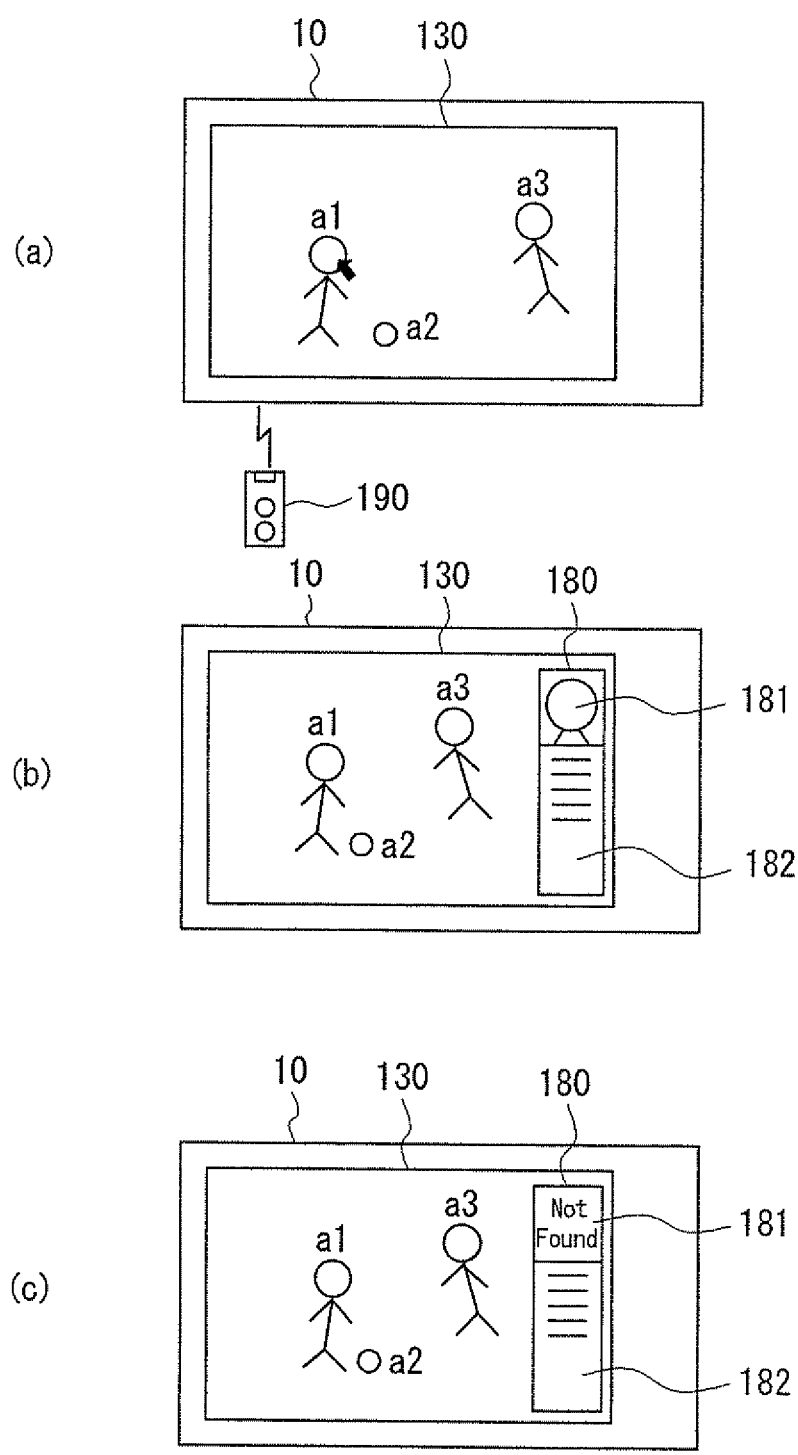
FIG. 19 is a diagram illustrating exemplary displays on a screen of the communication terminal according to a sixth embodiment of the present invention.

FIG. 19 is a diagram illustrating exemplary displays on the display unit 130 of the communication terminal 10 according to the sixth embodiment of the present invention. The user can indicate an object by operating the remote operation unit 192 of the remote operation terminal 190 to move a pointer (arrow, for example) on the display unit 130. For example, if the remote operation unit 192 has the acceleration sensor, the angular sensor or the like, the user can move the pointer on the display unit 130 by moving the remote operation terminal 190. If the remote operation unit 192 has input keys, the user can move the pointer on the display unit 130 by operating the keys.

When the user indicates an object a1 on the display unit 130 by using the remote operation terminal 190 (FIG. 19(*a*)), the communication terminal 10 transmits search data corresponding to the object a1 to the search server 20. When receiving the search data, the search server 20 transmits a search result including object data or error information corresponding to the search data to the communication terminal 10.

For example, if the search result from the search server 20 includes the object data of the object a1, the object data of the object a1 are displayed in the additional window 180 on the display unit 130 (FIG. 19(*b*)). In contrast, if the search result includes search error notification, "Not Found", indicating that the object data of the object a1 cannot be found, is displayed in the image window 181 of the additional window 180 on the display unit 130 and a detailed description of such error is displayed in the attribute window 182 (FIG. 19(*c*)).

According to the present embodiment, since the user can indicate an object by using the remote operation terminal, the user can easily operate the display unit even when watching a TV at a position away therefrom, which improves convenience for the user.

Seventh Embodiment

According to a seventh embodiment, the remote operation terminal according to the sixth embodiment has a display unit to display information on object data.

Figure 20:
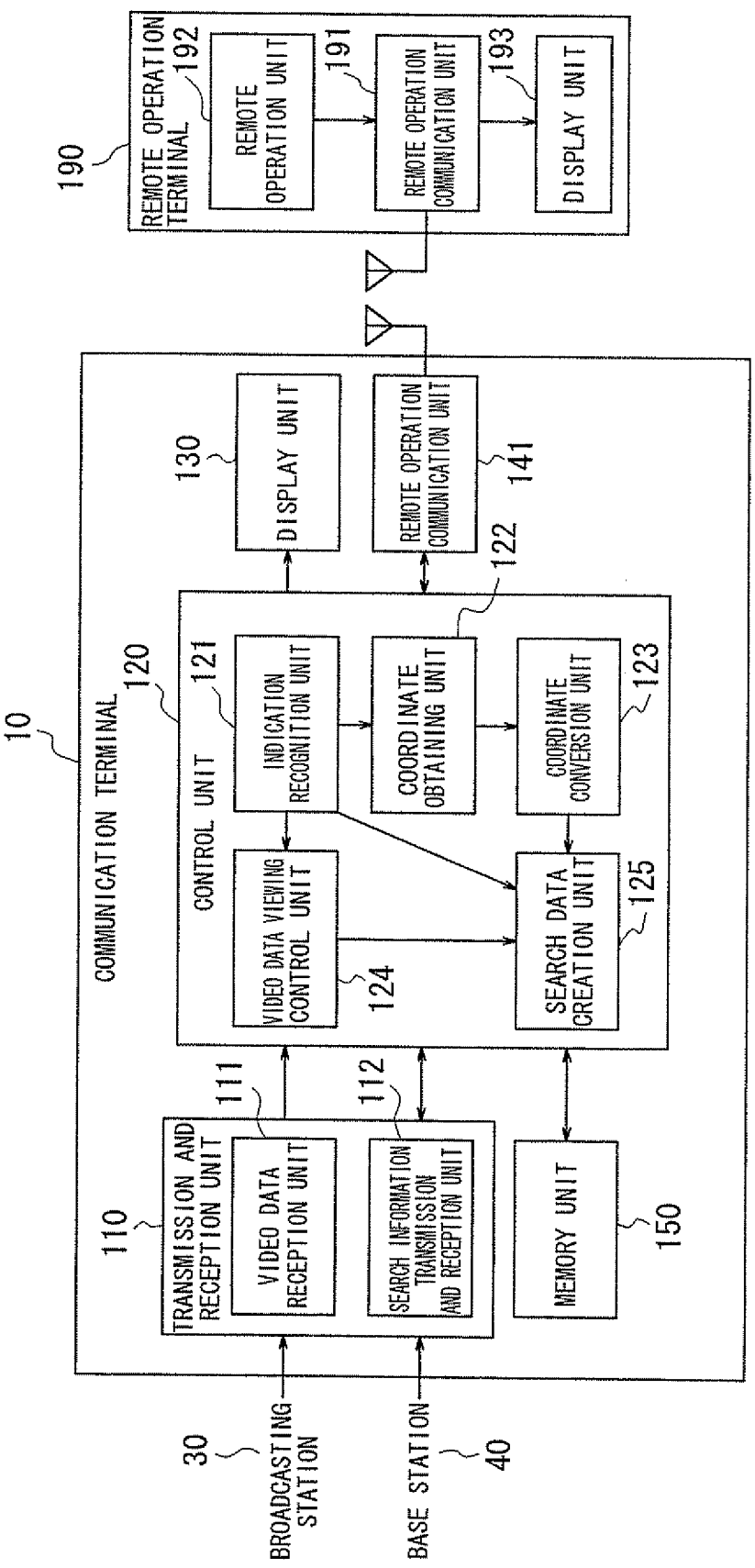
FIG. 20 is a functional block diagram illustrating schematic constitutions of the communication terminal and a remote operation terminal according to one embodiment of the present invention.

FIG. 20 is a functional block diagram illustrating schematic constitutions of the communication terminal 10 and the remote operation terminal 190 according to the seventh embodiment of the present invention. As shown in FIG. 20, a display unit 193 (second display unit) is added to the remote operation terminal 190 shown in FIG. 18. The display unit 193 may be a liquid crystal display or any other suitable display device. It is to be noted that the functional blocks with the same reference signs as those in FIG. 18 have the same functions.

Figure 21:
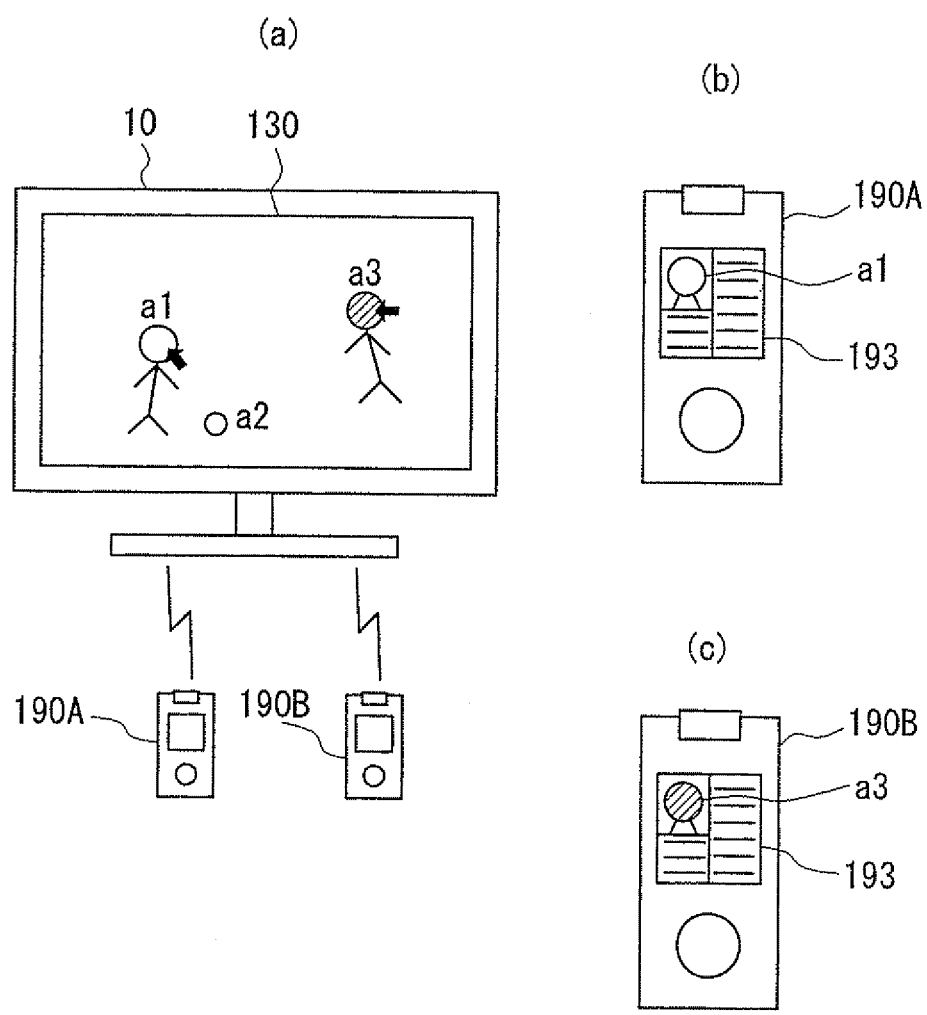
FIG. 21 is a diagram illustrating exemplary displays of screens of the communication terminal and the remote operation terminal according to a seventh embodiment of the present invention.

FIG. 21 is a diagram illustrating exemplary displays of the display unit 130 of the communication terminal 10 and the display unit 193 of the remote operation terminal 190, according to the seventh embodiment of the present invention. As shown in FIG. 21, a user A performs indication input to the object a1 on the display unit 130 by operating a remote operation terminal 190A, whereas a user B performs indication input to the object a3 on the display unit 130 by operating a remote operation terminal 190B (FIG. 21(*a*)). In this case, since two remote operation terminals are used, the communication terminal 10 can identify indication input from each of the remote operation terminals by using predetermined identification information, such as an ID, for example, of each of the remote operation terminals.

When receiving remote operation from the remote operation terminal 190A, the communication terminal 10 transmits search data corresponding to the object a1 to the search server 20. When receiving the search data, the search server 20 transmits a search result including object data or error information corresponding to the search data to the communication terminal 10. In addition, when receiving remote operation from the remote operation terminal 190B, the communication terminal 10 transmits search data corresponding to the object a3 to the search server 20. When receiving the search data, the search server 20 transmits a search result including object data or error information corresponding to the search data to the communication terminal 10.

When receiving the search result from the search server 20 and obtaining the object data of the objects a1 and a3, for example, the communication terminal 10 transmits the object data of the object a1 and the object data of the object a3 to the remote operation terminal 190A and the remote operation terminal 190B, respectively. That is, the control unit 120 of the communication terminal 10 controls the remote operation communication unit 141 such that the object data of the object a1 and the object data of the object a3 are transmitted to the remote operation terminal 190A and the remote operation terminal 190B, respectively. Accordingly, the object data of the object a1 are displayed on the display unit 193 of the remote operation terminal 190A (FIG. 21(*b*)), whereas the object data of the object a3 are displayed on the display unit 193 of the remote operation terminal 190B (FIG. 21(*c*)).

According to the present embodiment, the user can indicate an object by using the remote operation terminal and also display object data about the object on the remote operation terminal. Therefore, the user can easily operate the display unit even when watching a TV at a position away therefrom and view obtained information on the remote operation terminal at hand, which improves convenience for the user. In addition, if the object data are displayed on the display unit 193 of the remote operation terminal 190 and not displayed on the display unit 130 of the communication terminal 10, it is possible for the user to view obtained data without interfering other users when a plurality of users are viewing a video displayed on the display unit 130 of the communication terminal 10.

Although the present invention has been described with reference to drawings and the embodiments, it will be understood by those skilled in the art that the present invention is not limited to the embodiments set forth above but may be varied or modified in a multiple manner. Accordingly, such variations and modifications are included within a scope of the present invention.

For example, although the video data are described as a video of the digital broadcasting in the above embodiments, the present invention is not limited thereto but may be applicable to video distributed via an electric communication link such as the internet, for example. In this case, each of the transmission and reception unit 110 of the communication terminal 10 and the transmission and reception unit 210 of the search server 20 does not need to have an interface for the video data and an interface for transmission and reception of the search information separately but may be constituted of a single common interface.

In addition, although the indicated coordinate information included in search data transmitted by the communication terminal 10 is converted into a coordinate by the coordinate conversion unit 123, such conversion can be performed by the search server. In this case, the indicated coordinate information included in the search data transmitted from the communication terminal 10 to the search server 20 is based on a coordinate system of the display unit 130 of the communication terminal 10 and the search data includes terminal screen information on the display unit 130 of the communication terminal 10. When receiving such search data from the communication terminal 10, the search server 20 converts the indicated coordinate information into coordinate information based on the coordinate system of the video data, based on the terminal screen information included in the search data, and recognizes an object corresponding to an indication by the user. Delegating conversion of coordinate to the server in this manner enables the communication terminal 10 to have a simple configuration and to have fewer loads in processing.

In addition, there may be a case in which the first service identifier included in the search data is not identical to the second service identifier for identifying a service providing the video data displayed on the display unit 130, such as when the user changes a program after the communication terminal 10 transmits the search data to the search server 20 and object data from the search server 20 are received. In this case, since user's interest may change from when indicating the object and to a time receiving the search result, a search result received from the search server 20 may be displayed in one of the following modes.

In a first display mode, if the first service identifier and the second service identifier are not identical, the control unit 120 may display that the object data are received on the display unit 130. In this mode, if the first service identifier and the second service identifier are not identical, the control unit 120 may notify the user that a search result for the first service identifier is received, by using a pop-up window and the like. When receiving such notification, the user may instruct to display the object data included in the search result by indicating the pop-up window.

In a second display mode, if the first service identifier and the second service identifier are not identical, the control unit 120 stores the search result (object data) in the memory unit 150 so as to display the object data on the display unit 130 when the service providing the video data displayed on the display unit 130 is changed and the first service identifier and the second service identifier become identical. In this mode, the object data are displayed after the first service identifier and the second service identifier become identical, it is thus possible to display object data desired by the user alone.

In addition, the communication terminal 10 is generally capable of executing a plurality of applications. In this case, a function of the communication terminal 10 to view the video is nothing more than one of the plurality of applications. Therefore, the user may end execution of such a video viewing application after the search data are transmitted to the search server in response to an indication to the video by the user, before a search result is received. If there is an instruction to end the video viewing application after transmission of the search data and before reception of the search result, some functions of the video viewing application may be remained running. For example, if the transmission and reception unit 110 is remained running when there is an instruction to end the video viewing application before reception of the search result, it is possible to restart other functions (control unit 120 and the like) of the video viewing application and display received object data on the display unit 130 when the transmission and reception unit 110 receives the search result from the search server 20.

Moreover, if the indication recognition unit 121 recognizes an indication to an object by the user, the control unit 120 of the communication terminal 10 may instruct the video data viewing control unit 124 to pause a video such that the user can indicate an object in a video paused. In this case, the video or images for a predetermined time are stored in the memory unit 150 such that, if the object desired by the user is not shown in the video paused because the user indicated too late, the user may instruct the control unit 120 to rewind or to display previous images by operating the operation unit 140 such that the display unit 130 displays the image showing the desired object and the user indicates the desired object on the image.

It is to be noted that, when the object data are received from the search server 20, it is possible to notify the user of such reception by using voice, vibration, light and the like, and it is also possible to notify the user of attribute information of each object data by using voice.

In addition, in the sixth and seventh embodiments with regard to remote operation of the communication terminal, the remote operation terminal 190 may have communication functions (a second transmission unit and a second object data reception unit) for performing communications in relation to the object data with the search server 20. In this case, when the user indicates object data on the display unit 130 by using the remote operation terminal 190, the communication terminal 10 transmits search data corresponding to the object data to the remote operation terminal 190. That is, the control unit 120 of the communication terminal 10 controls the remote operation communication unit 141 to transmit the search data created by the search data creation unit 125 to the remote operation terminal 190. The remote operation terminal 190 transmits the search data received from the communication terminal 10 to the search server 20. When receiving the search data, the search server 20 transmits a search result including object data or error information corresponding to the search data to the remote operation terminal 190. If the remote communication terminal 190 has the display unit 193, the remote operation terminal 190 may display the search result on the display unit 193. If the remote communication terminal 190 does not have the display unit 193, the remote operation terminal 190 transmits the search result to the communication terminal 10 such that the communication terminal 10 displays the search result on the display unit 130.

It is to be noted that, if the remote operation terminal 190 has a communication function, the search information transmission and reception unit 112 of the communication terminal 10 may be omitted.

In addition, the present invention is not limited to the terrestrial digital broadcasting (1 seg) broadcasting but applicable to any digital broadcasting such as MediaFLO and the like, for example.

It is to be understood that, although it is assumed to use cdma2000 1xEV-DO, iBurst, a wireless LAN or the like as the wireless communication scheme in the above embodiments, the present invention is not limited thereto but applicable to any wireless communication network either currently used or expected to put into practical use in the future, such as PDC (Personal Digital Cellular), W-CDMA (Wideband CDMA), WiMAX (IEEE802.16), LTE (Long Term Evolution), UMB (Ultra Mobile Broadband) and the like, for example.

REFERENCE SIGNS LIST 10 communication terminal
20 search server
30 broadcasting station
40 base station
50 WAN
110 transmission and reception unit
111 video data reception unit
112 search information transmission and reception unit
120 control unit
121 indication recognition unit
122 coordinate obtaining unit
123 coordinate conversion unit
124 video data viewing control unit
125 search data creation unit
126 indication form determination unit
130 display unit
140 operation unit
141 remote operation communication unit
150 memory unit
170 input device
180 additional window
181 image window
182 attribute window
183 enlarged image window
184 reduced attribute window
190 remote operation terminal
191 remote operation communication unit
192 remote operation unit
193 display unit
210 transmission and reception unit
211 data obtaining unit
212 search information transmission and reception unit
220 control unit
221 object recognition unit
222 object data search unit
223 search result creation unit
230 memory unit

The invention claimed is:

1. A communication terminal comprising:
a video data reception unit configured to receive video data that includes an object;
a display unit configured to display video corresponding to the video data received by the video data reception unit;
an indication input unit configured to receive an indication input to the display unit;
an indication recognition unit configured to recognize whether the indication input corresponds to video displayed on the display unit;
a transmission unit configured to transmit search data to a search server when the indication recognition unit recognizes that the indication input corresponds to the video, wherein
the search data includes: (i) indicated coordinate information corresponding to a coordinate on the video based on a location of the indication input, wherein the indicated coordinate information is based on a coordinate system of the video data displayed on the display unit or a coordinate system of the display unit of the communication terminal that displays the video data and (ii) indication timing information corresponding to a predetermined time stamp of the video data based on a time of the indication input;
an indication form determination unit configured to determine an indication form drawn by a locus of indicated coordinates of continuous indications to the video, wherein:
(a) if the indication form determination unit determines that the indication form is a circle, the search data further includes:
indicated coordinate information on a central coordinate of the circle calculated by the indication form determination unit,
indicated coordinate information indicating an indication farthermost from the central coordinate among the continuous indications, and
indication timing information corresponding to one of the continuous indications;
or
(b) if the indication form determination unit determines that the indication form is a line, the search data further includes at least:
indicated position coordinate and indication timing information corresponding to a first indication of the continuous indications, and
indicated position coordinate and indication timing information corresponding to a last indication of the continuous indications;
wherein the search server uses the search data to search for and obtain object data relating to the object displayed on the display unit, which includes attribute information of the object displayed on the display unit;
an object data reception unit configured to receive the object data; and
a control unit configured to control the display unit to display the object data received by the object data reception unit.

2. The communication terminal according to claim 1, wherein
the search data includes a plurality of indication timing information indicating times before the indication.

3. The communication terminal according to claim 1, wherein
if the indication recognition unit recognizes continuous indications to the video, the search data includes indicated coordinate information and indication timing information based on each of the continuous indications.

4. The communication terminal according to claim 1, wherein
if the indication recognition unit recognizes continuous indications to the video having a locus of indicated coordinates with an intersection, the search data includes indicated coordinate information on a range surrounded by the locus of the indicated coordinates of the continuous indications and indication timing information corresponding to the continuous indications.

5. The communication terminal according to claim 1, wherein
the indicated coordinate information identifies a location in the video data corresponding to a location at which the indication input was received to the display unit.

6. The communication terminal according to claim 1, wherein
the indicated coordinate information identifies a location on the display unit corresponding to a location at which the indication input was received to the display unit of the communication terminal, and
the search data includes terminal screen information on the display unit of the communication terminal.

7. The communication terminal according to claim 1, wherein
if the indication recognition unit recognizes an indication to the video, the control unit specifies a service identifier for identifying a service to provide the video data and inserts the service identifier into the search data.

8. The communication terminal according to claim 7, wherein
if a first service identifier included in the search data is identical to a second service identifier for identifying a service to provide video data displayed on the display unit when the object data reception unit receives the object data from the search server, the control unit displays the object data on the display unit.

9. The communication terminal according to claim 7, wherein
if a first service identifier included in the search data is not identical to a second service identifier for identifying a service to provide video data displayed on the display unit when the object data reception unit receives the object data from the search server, the control unit displays that the object data is received on the display unit.

10. The communication terminal according to claim 7, further comprising:
a memory unit configured to store object data received from the search server, wherein,
if a first service identifier included in the search data is not identical to a second service identifier for identifying a service to provide video data displayed on the display unit when the object data reception unit receives the object data from the search server, the control unit stores the object data in the memory unit and,
when the service to provide the video data displayed on the display unit is changed and the first service identifier and the second service identifier become identical to each other, the display unit displays the object data stored in the memory unit.

11. The communication terminal according to claim 1, wherein
if the object data includes information on a plurality of objects, the control unit displays individual images specified based on the indicated coordinate information and on information on the plurality of objects on the display unit.

12. The communication terminal according to claim 11, wherein
if the indication recognition unit recognizes an indication to the individual images, the control unit enlarges the individual images on the display unit, and
if the indication recognition unit recognizes an indication to an enlarged individual image, the control unit displays object data of an object corresponding to the indication on the display unit.

13. The communication terminal according to claim 11, wherein
if the indication recognition unit recognizes an indication to the information on the plurality of objects, the control unit displays object data of an object corresponding to the indication on the display unit.

14. The communication terminal according to claim 1, further comprising:
a remote operation communication unit configured to communicate with a remote operation terminal capable of remotely inputting an indication to the display unit.

15. The communication terminal according to claim 14, wherein the remote operation terminal includes:
a remote operation unit configured to receive an indication input to the display unit, and
a second remote operation communication unit configured to communicate with the remote operation communication unit.

16. The communication terminal according to claim 15, wherein
the remote operation terminal has a second display unit, and
the control unit displays the object data received by the object data reception unit on the second display unit.

17. The communication terminal according to claim 15, wherein
the remote operation terminal has a second transmission unit configured to transmit the search data to the search server and a second object data reception unit configured to receive object data searched by the search server based on the search data.

18. A search server comprising:
a memory unit configured to store video data, that includes an object, and object data of at least one object shown in video;
a reception unit configured to receive search data from a communication terminal, wherein
the search data includes: (i) indicated coordinate information corresponding to a coordinate on the video based on a location of an indication to the video, wherein the indicated coordinate information is based on a coordinate system of the video that is displayed on a display unit of the communication terminal or a coordinate system of the display unit of the communication terminal that displays the video and (ii) indication timing information corresponding to a predetermined time stamp of the video based on a time of the indication to the video;
an indication form determination unit configured to determine an indication form drawn by a locus of indicated coordinates of continuous indications to the video, wherein:
(a) if the indication form determination unit determines that the indication form is a circle, the search data further includes:
indicated coordinate information on a central coordinate of the circle calculated by the indication form determination unit,
indicated coordinate information indicating an indication farthermost from the central coordinate among the continuous indications, and
indication timing information corresponding to one of the continuous indications;
or
(b) if the indication form determination unit determines that the indication form is a line, the search data further includes at least:
indicated position coordinate and indication timing information corresponding to a first indication of the continuous indications, and
indicated position coordinate and indication timing information corresponding to a last indication of the continuous indications;
a recognition unit configured to recognize an object displayed on the display unit corresponding to the indication to the video based on the search data;
a search unit configured to search for object data corresponding to the object displayed on the display unit recognized by the recognition unit in the memory unit, wherein the object data includes attribute information of the object displayed on the display unit;
a search result creation unit configured to create a search result including the object data searched by the search unit; and
a transmission unit configured to transmit the search result to the communication terminal.

19. The search server according to claim 18, wherein
the recognition unit recognizes an object corresponding to the indication to the video based also on timing information indicating a time before the indication timing information and the indicated coordinate information.

20. The search server according to claim 18, wherein
if the search data includes a plurality of indicated coordinate information and indication timing information, the recognition unit recognizes an object corresponding to the indication to the video based on the plurality of indicated coordinate information and the indication timing information.

21. The search server according to claim 18, wherein
if the search data includes two indicated coordinate informations and a single indication timing information, the recognition unit recognizes one of the two indicated coordinate informations as that indicating a central coordinate of a circle and another of the two indicated coordinate informations as that of an indication farthermost from the central coordinate of the circle and, recognizes an object corresponding to the indication to the video based on a coordinate within the circle defined by the two indicated coordinate informations and the single indication timing information.

22. The search server according to claim 18, wherein
if the search data includes at least two combinations of indicated coordinate information and indication timing information, the recognition unit recognizes the indicated coordinate information and the indication timing information of one of the at least two combinations as indicated coordinate information indicating a start of a line and indication timing information at the start of an instruction, respectively, and the indicated coordinate information and the indication timing information of the other combination of the at least two combinations as indicated coordinate information indicating an end of the line and indication timing information at the end of the indication, respectively, and recognizes an object corresponding to the indication to the video along the line defined by the at least two combinations.

23. The search server according to claim 18, wherein
if the indicated coordinate information included in the search data is based on a coordinate system of a screen of the communication terminal and the search data includes terminal screen information on the screen of the communication terminal, the recognition unit, based on the terminal screen information, converts the indicated coordinate information into a coordinate system of the video data and recognizes an object corresponding to the indication by a user.

24. The search server according to claim 18, wherein
if the recognition unit recognizes a plurality of objects corresponding to the indication to the video, the search unit searches for a plurality of object data corresponding to the plurality of objects, respectively, and the search result creation unit inserts the plurality of object data and individual images, specified based on the indicated coordinate information, into the search result.

25. A communication system comprising:
a search server configured to store video data, including an object, and object data included in the video; and
a communication terminal configured to receive and display video corresponding to the video data and communicate with the search server, wherein
the communication terminal recognizes an indication to the video and transmits search data to the search server,
the search data includes: (i) indicated coordinate information corresponding to a coordinate on the video based on a location of the indication, wherein the indicated coordinate information is based on a coordinate system of the video that is displayed on a display unit of the communication terminal or a coordinate system of the display unit of the communication terminal that displays the video and (ii) indication timing information corresponding to a predetermined time stamp of the video and that determines a frame of the video based on a time of the indication;
wherein the communication terminal determines an indication form drawn by a locus of indicated coordinates of continuous indications to the video, wherein:
(a) if the communication terminal determines that the indication form is a circle, the search data further includes:
indicated coordinate information on a central coordinate of the circle calculated by the communication terminal,
indicated coordinate information indicating an indication farthermost from the central coordinate among the continuous indications, and
indication timing information corresponding to one of the continuous indications;
or
(b) if the communication terminal determines that the indication form is a line, the search data further includes at least:
indicated position coordinate and indication timing information corresponding to a first indication of the continuous indications, and
indicated position coordinate and indication timing information corresponding to a last indication of the continuous indications;
wherein the search server:
i) uses the search data to search for and obtain object data relating to the object displayed on the display unit, which includes attribute information of the object displayed on the display unit, ii) receives the search data, iii) searches for object data corresponding to the search data, and iv) transmits the object data searched to the communication terminal, and
the communication terminal receives and displays the object data.

* * * * *